(12) United States Patent
Ueda et al.

(10) Patent No.: US 7,293,180 B2
(45) Date of Patent: Nov. 6, 2007

(54) APPARATUS, METHOD AND PROGRAM FOR DATA PROCESSING, AND APPARATUS, METHOD AND PROGRAM FOR TAMPER DETECTION

(75) Inventors: Kenjiro Ueda, Yokohama (JP); Masayoshi Nishitani, Yokosuka (JP); Takayuki Sugahara, Yokosuka (JP)

(73) Assignee: Victor Company of Japan, Ltd. (JP)

( * ) Notice: Subject to any disclaimer, the term of this patent is extended or adjusted under 35 U.S.C. 154(b) by 805 days.

(21) Appl. No.: 10/814,533

(22) Filed: Mar. 31, 2004

(65) Prior Publication Data

US 2004/0190717 A1 Sep. 30, 2004

(30) Foreign Application Priority Data

Mar. 31, 2003 (JP) .............................. 2003-093383
Oct. 16, 2003 (JP) .............................. 2003-356791

(51) Int. Cl.
G06F 9/00 (2006.01)
(52) U.S. Cl. ...................... 713/194; 713/161; 713/164; 713/165; 713/166
(58) Field of Classification Search ................ 713/194, 713/161, 164, 165, 166
See application file for complete search history.

(56) References Cited

U.S. PATENT DOCUMENTS 6,633,653 B1   10/2003   Hobson et al. ............. 382/100

FOREIGN PATENT DOCUMENTS

JP       11-196392      7/1999

(Continued)

OTHER PUBLICATIONS

"An Improved Tamper-Detection Method for Digtal Images" by Intaek Kim et al., Industrial Electronics, Jun. 12, 2001, pp. 227-231.

(Continued)

*Primary Examiner*—Thomas R. Peeso
(74) *Attorney, Agent, or Firm*—Renner, Kenner Greive, Bobak, Taylor & Weber

(57) ABSTRACT

Digital video data is encryptically processed and then subjected to an encoding procedure with orthogonal transform to produce a coded video signal. A representative value of luminance of pixels of the digital video data is obtained for each of pixel blocks having a predetermined number of pixels, each pixel block corresponding to a unit of data subjected to the encoding procedure, as a quantized integer for each pixel block by using a specific function with the stored luminance data as a parameter. It is determined whether the quantized integer of the representative value for each pixel block is a multiple of a preset integer N of two or larger, and, if not, the stored luminance data are rewritten with a specific requirement giving the least range of change in gradation so that the quantized integer becomes a multiple of the integer N, whereas the stored luminance data remain unchanged if the quantized integer is a multiple of the integer N, thus the digital video data being encryptically processed. The encryptically processed digital video data is encoded with orthogonal transform to produce a coded video signal. The coded video signal is decoded. A second representative value of luminance data of the decoded signal is obtained as a quantized integer for each pixel block by using the specific function with the luminance data as the parameter. The quantized integer of the second representative value is divided by the integer N. It is determined that the video data has been tampered with when remainders of division meet predetermined tamer criteria.

24 Claims, 11 Drawing Sheets

FOREIGN PATENT DOCUMENTS

| | | |
|---|---|---|
| JP | 2000-122861 | 4/2000 |
| JP | 2002-016596 | 1/2002 |

OTHER PUBLICATIONS

"Compression Tolerant Watermarking for Image Verification" by Bassali et al., Image Processing, Sep. 10, 2000, pp. 430-433.

"Color Image Watermarking Robust to JPEG Compression" by Puech et al., CGIV. European Conference on Colour in Graphics, Image and Vision, Apr. 2, 2002, pp. 81-85.

"Image Enhancement Towards Soft Image Authentication" by Xie et al., Multimedia and Expo, Jul. 30, 2000, pp. 497-500.

Mean Quantization Blind Watermarking for Image Authentication, Gwo-Jong Yu et al., Image Processing, Sep. 10, 2000, pp. 706-709.

APPARATUS, METHOD AND PROGRAM FOR DATA PROCESSING, AND APPARATUS, METHOD AND PROGRAM FOR TAMPER DETECTION

BACKGROUND OF THE INVENTION

The present invention relates to a data processing apparatus, a tamper detection apparatus, a data processing method, a tamper detection method, a data processing program and a tamper detection program. Particularly, this invention relates to an apparatus, a method and a program for accurately determining whether digital video data has been tampered with even after it had been encrypted but before subjected to coding processing including orthogonal transform.

Distribution of digital contents, such as video and music, has been popular not only through package media but also communications networks, such as the Internet.

Several techniques have been proposed for determining whether those digital contents have been tampered with while they are distributed.

One popular digital authentication technique for detecting tampering uses a hash function which is disclosed, for example, in Japanese Unexamined patent Publication Nos. 11 (1999)-196392, 2000-122861 and 2002-016596.

A hash function is an operational function to disturb and compress long data into a hash value of fixed length such as 128 bits. It is a one-way function h_K by which it is almost impossible to find "x" that establishes y=h_K(x) when "y" is given.

In use of the hash function for temper detection, "x" is data (having any length), "y" is a hash value (having a fixed length) and h_K is changeable by a private key "K" known by only persons who transfer the data "x" and receive it.

In this digital authentication, data "X" is transferred with a hash value. Both data "X" and a hash value may be encrypted for higher security.

A person who receives the data "x" calculates a hash value and determines that the data "x" has not been tampered with if the calculated value is equal to the transferred hash value "y" whereas it has been tampered with if the former value is not equal to the latter.

Popular hash functions are MD 5 (Message Digest 5) and SHA (Secure Hash Algorism) which are explained in detail in a no-patent literature "Cryptography for Beginners" written by Eiji Okamoto and published by Kyoritu Publishing Co.

Video data usually contain a huge amount of data, so that they are mostly subjected to irreversible compression with orthogonal transform, such as JPEG (Joint Photographic Experts Group) or MPEG (Moving picture Experts Group) before distribution.

Irreversible compression achieving high compression rate is often used in distribution of video data through a communications network for shortening a transfer time.

The digital authentication technique using a hash function determines that data has been tampered with even if one digit of the data has been modified.

Thus, this digital authentication technique requires information for finding tempering to be added to video data after data compression. In other words, addition of such information before compression of the video data causes change in a lot of bits, which makes finding tempering impossible. Moreover, once such information is added, video data cannot be reprocessed.

Therefore, the known digital authentication technique causes many problems to video-data distributors in data handling and distribution.

SUMMARY OF THE INVENTION

A purpose of the present invention is to provide a data processing apparatus, a tamper detection apparatus, a data processing method, a tamper detection method, a data processing program and a tamper detection program which can determine whether data has been tampered with even though information for finding tempering had been added to video data before data compression.

The present invention provides an apparatus for encryptically processing digital video data, followed by an encoding procedure to the processed digital video data with orthogonal transform to produce a coded video signal, the apparatus comprising: a representative-value calculator to obtain a representative value of luminance data of a plurality of pixels of the digital video data for each of pixel blocks having a predetermined number of pixels, each pixel block corresponding to a unit of data subjected to the encoding procedure, as a quantized integer for each pixel block by using a specific function with the stored luminance data as a parameter, a data rewriter to determine whether the quantized integer of the representative value for each pixel block is a multiple of a preset integer N of two or larger, and, if not, rewrite the stored luminance data with a specific requirement giving the least range of change in gradation so that the quantized integer becomes a multiple of the integer N, whereas the stored luminance data remain unchanged if the quantized integer is a multiple of the integer N, thus encryptically processing the digital video data; and an encoder to encode the encryptically processed digital video data with orthogonal transform to produce a coded video signal.

Moreover, the present invention provides an apparatus for determining whether digital video data has been tampered with, the apparatus comprising: a decoder to decode a coded video signal produced by obtaining a first representative value of luminance data of a plurality of pixels of digital video data for each of pixel blocks, as a quantized integer for each pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal; a representative-value calculator to obtain a second representative value of the luminance data of the decoded video signal as a quantized integer for each pixel block by using the specific function with the luminance data as the parameter; a divider to divide the quantized integer of the second representative value by the integer N; and a tamper detector to determine that the video data has been tampered with when remainders of division meet predetermined tamer criteria.

Furthermore, the present invention provides an apparatus for determining whether digital video data has been tampered with, the apparatus comprising: a decoder to decode a coded video signal produced by obtaining a first representative value of luminance data of a plurality of pixels of digital video data for each of pixel blocks, as a quantized integer for each pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal; a representative-value calculator to obtain a second representative value of the luminance data of the decoded video signal as a quantized integer for each pixel block by using the specific function with the luminance data as the parameter; a divider to divide the quantized integer of the second representative value by the integer N, the division being performed for all the pixel blocks to obtain remainders; and a tamper detector to determine that the video data has been tampered with when at least one remainder other than zero is found among the remainders for one pixel block of the video data.

Still, furthermore, the present invention provides an apparatus for determining whether digital video data has been tampered with, the apparatus comprising: a decoder to decode a coded video signal produced by obtaining a first representative value of luminance data of a plurality of pixels of digital video data for each of pixel blocks, as a quantized integer per pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform to produce the coded signal; a representative-value calculator to obtain a second representative value of the luminance data of the decoded video signal as a quantized integer for each pixel block by using the specific function with the luminance data as the parameter; a divider to divide the quantized integer of the second representative value by the integer N; a calculator to count the number of remainders given by the divider, the remainders corresponding to a video zone of a specific size; and a tamper detector to determine that the video data has been tampered with in the video zone of the specific size when tamper criteria A/(A+B)≦Z1 is met, where A and B are the number of remainders zeros and other remainders, respectively, among the remainders given by the divider, and Z1 is a preset value larger than 1/N.

Furthermore, the present invention provides an apparatus for determining whether digital video data has been tampered with, the apparatus comprising: a decoder to decode a coded video signal produced by obtaining a first representative value of luminance data of a plurality of pixels of digital video data for each of pixel blocks, as a quantized integer per pixel block by using a specific function with the luminance data as a parameter, rewriting the luminance data with a specific requirement giving the least range of change in gradation so that the quantized integer of the first representative value becomes a multiple of an integer N of four or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal; a representative-value calculator to obtain a second representative value of the luminance data of the decoded signal as a quantized integer for each pixel block by using the specific function with the luminance data as the parameter; a divider to divide the quantized integer of the second representative value by the integer N; a calculator to count the number of remainders given by the divider, the remainders corresponding to a video zone of a specific size; and a tamper detector to determine that the video data has been tampered with in the video zone of the specific size when tamper criteria A/(A+C)≦Z2 is met, where A is the number of remainders zeros among the remainders given by the divider and C is the number of remainders among the remainders given by the divider but each being a median from among zero to the integer N, and Z2 is a preset value larger than 1/N, the remainders to be counted as the number C being two integers most close to the integer N when the integer N is an odd number.

Still, furthermore, the present invention provides a method of encryptically processing digital video data, followed by an encoding procedure to the processed digital video data with orthogonal transform to produce a coded video signal, the method comprising the steps of: obtaining a representative value of luminance of a plurality of pixels of the digital video data for each of pixel blocks having a predetermined number of pixels, each pixel block corresponding to a unit of data subjected to the encoding procedure, as a quantized integer for each pixel block by using a specific function with the stored luminance data as a parameter; determining whether the quantized integer of the representative value for each pixel block is a multiple of a preset integer N of two or larger, and, if not, rewriting the stored luminance data with a specific requirement giving the least range of change in gradation so that the quantized integer becomes a multiple of the integer N, whereas the stored luminance data remain unchanged if the quantized integer is a multiple of the integer N, thus encryptically processing the digital video data; and encoding the encryptically processed digital video data with orthogonal transform to produce a coded video signal.

Moreover, the present invention provides a method of determining whether digital video data has been tampered with, the method comprising the steps of: decoding a coded video signal produced by obtaining a first representative value of luminance data of a plurality of pixels of digital video data for each of pixel blocks, as a quantized integer for each pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal; obtaining a second representative value of the luminance data of the decoded video signal as a quantized integer for each pixel block by using the specific function with the luminance data as the parameter, dividing the quantized integer of the second representative value by the integer N; and determining that the video data has been tampered with when remainders of division meet predetermined tamer criteria.

Furthermore, the present invention provides a method of determining whether digital video data has been tampered with, the method comprising the steps of: decoding a coded video signal produced by obtaining a first representative value of luminance data of a plurality of pixels of digital video data for each of pixel blocks, as a quantized integer for each pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal; obtaining a second representative value of the luminance data of the decoded video signal as a quantized integer for each pixel block by using the specific function with the luminance data as the parameter; dividing the quantized integer of the second representative value by the integer N, the division being performed for all the pixel blocks to obtain remainders; and determining that the video data has been tampered with when at least one remainder other than zero is found among the remainders for one pixel block of the video data.

Still, furthermore, the present invention provides a method of determining whether digital video data has been tampered with, the method comprising the steps of decoding a coded video signal produced by obtaining a first representative value of luminance data of a plurality of pixels of digital video data for each of pixel blocks, as a quantized integer per pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform to produce the coded signal; obtaining a second representative value of the luminance data of the decoded video signal as a quantized integer for each pixel block by using the specific function with the luminance data as the parameter; dividing the quantized integer of the second representative value by the integer N; counting the number of remainders given in the dividing step, the remainders corresponding to a video zone of a specific size; and determining that the video data has been tampered with in the video zone of the specific size when tamper criteria $A/(A+B) \leq Z1$ is met, where A and B are the number of remainders zeros and other remainders, respectively, among the remainders given in the dividing step, and Z1 is a preset value larger than 1/N.

Moreover, the present invention provides a method of determining whether digital video data has been tampered with, the method comprising the steps of decoding a coded video signal produced by obtaining a first representative value of luminance data of a plurality of pixels of digital video data for each of pixel blocks, as a quantized integer per pixel block by using a specific function with the luminance data as a parameter, rewriting the luminance data with a specific requirement giving the least range of change in gradation so that the quantized integer of the first representative value becomes a multiple of an integer N of four or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal; obtaining a second representative value of the luminance data of the decoded video signal as a quantized integer for each pixel block by using the specific function with the luminance data as the parameter; dividing the quantized integer of the second representative value by the integer N; counting the number of remainders given in the dividing step, the remainders corresponding to a video zone of a specific size; and determining that the video data has been tampered with in the video zone of the specific size when tamper criteria $A/(A+C) \leq Z2$ is met, where A is the number of remainders zeros among the remainders given in the dividing step and C is the number of remainders among the remainders given in the dividing step but each being a median from among zero to the integer N, and Z2 is a preset value larger than 1/N, the remainders to be counted as the number C being two integers most close to the integer N when the integer N is an odd number.

Furthermore, the present invention provides a computer-implemented method of for encryptically processing digital video data, followed by an encoding procedure to the processed digital video data with orthogonal transform to produce a coded video signal, the method comprising the steps of: obtaining a representative value of luminance of a plurality of pixels of the digital video data for each of pixel blocks having a predetermined number of pixels, each pixel block corresponding to a unit of data subjected to the encoding procedure, as a quantized integer for each pixel block by using a specific function with the stored luminance data as a parameter; determining whether the quantized integer of the representative value for each pixel block is a multiple of a preset integer N of two or larger, and, if not, rewriting the stored luminance data with a specific requirement giving the least range of change in gradation so that the quantized integer becomes a multiple of the integer N, whereas the stored luminance data remain unchanged if the quantized integer is a multiple of the integer N, thus encryptically processing the digital video data; and encoding the encryptically processed digital video data with orthogonal transform to produce a coded video signal.

Still, furthermore, the present invention provides a computer-implemented method of determining whether digital video data has been tampered with, the method comprising the steps of: decoding a coded video signal produced by obtaining a first representative value of luminance data of a plurality of pixels of digital video data for each of pixel blocks, as a quantized integer for each pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal; obtaining a second representative value of the luminance data of the decoded video signal as a quantized integer for each pixel block by using the specific function with the luminance data as the parameter; dividing the quantized integer of the second representative value by the integer N; and determining that the video data has been tampered with when remainders of division meet predetermined tamer criteria.

Moreover, the present invention provides a computer-implemented method of determining whether digital video data has been tampered with, the method comprising the steps of: decoding a coded video signal produced by obtaining a first representative value of luminance data of a plurality of pixels of digital video data for each of pixel blocks, as a quantized integer for each pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal; obtaining a second representative value of the luminance data of the decoded video signal as a quantized integer for each pixel block by using the specific function with the luminance data as the parameter; dividing the quantized integer of the second representative value by the integer N, the division being performed for all the pixel blocks to obtain remainders; and determining that the video data has been tampered with when at least one remainder other than zero is found among the remainders for one pixel block of the video data.

Furthermore, the present invention provides a computer-implemented method of determining whether digital video data has been tampered with, the method comprising the steps of: decoding a coded video signal produced by obtaining a first representative value of luminance data of a plurality of pixels of digital video data for each of pixel blocks, as a quantized integer per pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform to produce the coded signal; obtaining a second representative value of the luminance data of the decoded video signal as a quantized integer for each pixel block by using the specific function with the luminance data as the parameter; dividing the quantized integer of the second representative value by the integer N; counting the number of remainders given in the dividing step, the remainders corresponding to a video zone of a specific size; and determining that the video data has been tampered with in the video zone of the specific size when tamper criteria $A/(A+B) \leq Z1$ is met, where A and B are the number of remainders zeros and other remainders, respectively, among the remainders given in the dividing step, and Z1 is a preset value larger than 1/N.

Still, furthermore, the present invention provides a computer-implemented method of determining whether digital video data has been tampered with, the method comprising the steps of: decoding a coded video signal produced by obtaining a first representative value of luminance data of a plurality of pixels of digital video data for each of pixel blocks, as a quantized integer per pixel block by using a specific function with the luminance data as a parameter, rewriting the luminance data with a specific requirement giving the least range of change in gradation so that the quantized integer of the first representative value becomes a multiple of an integer N of four or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal; obtaining a second representative value of the luminance data of the decoded video signal as a quantized integer for each pixel block by using the specific function with the luminance data as the parameter, dividing the quantized integer of the second representative value by the integer N; counting the number of remainders given in the dividing step, the remainders corresponding to a video zone of a specific size; and determining that the video data has been tampered with in the video zone of the specific size when tamper criteria $A/(A+C) \leq Z2$ is met, where A is the number of remainders zeros among the remainders given in the dividing step and C is the number of remainders among the remainders given in the dividing step but each being a median from among zero to the integer N, and Z2 is a preset value larger than 1/N, the remainders to be counted as the number C being two integers most close to the integer N when the integer N is an odd number.

BRIEF DESCRIPTION OF DRAWINGS

FIG. 5 illustrates exemplary reminders given by a division processing for multiple pixel blocks at the tamper detection apparatus in the second embodiment, when video data has not been tampered with;

FIG. 6 illustrates exemplary reminders given by a division processing for multiple pixel blocks at the tamper detection apparatus in the third embodiment, when video data has not been tampered with;

DETAILED DESCRIPTION OF PREFERRED EMBODIMENTS

Several embodiments of a data processing apparatus, a tamper detection apparatus, a data processing method, a tamper detection method, a data processing program and a tamper detection program according to the present invention will be disclosed with reference to the attached drawings.

First Embodiment

Figure 1:
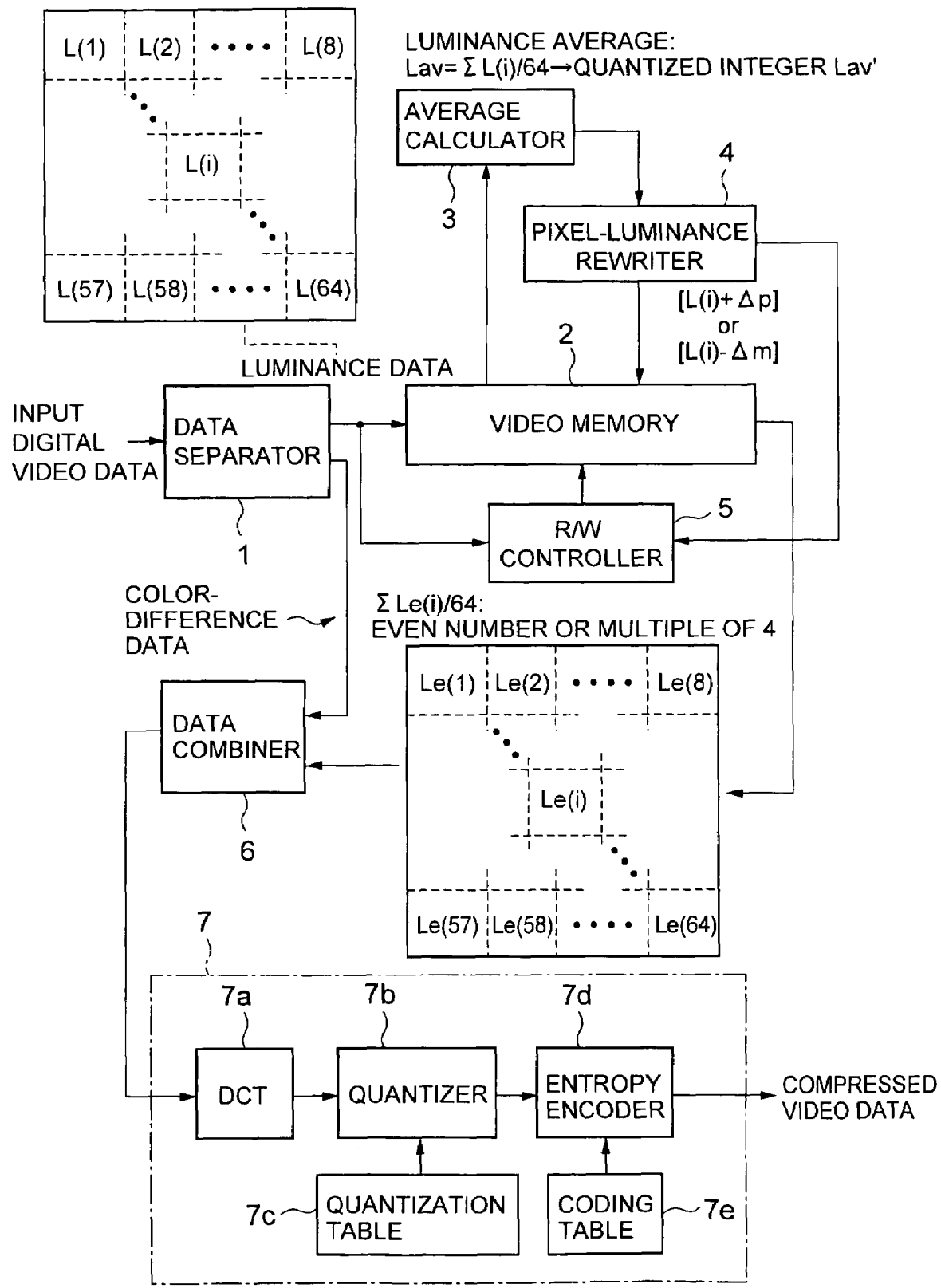
FIG. 1 shows a block diagram of a data processing apparatus for a first, a second and a third embodiment according to the present invention.

FIG. 1 shows a block diagram of an embodiment of a data processing apparatus according to the present invention.

The data processing apparatus is equipped with: a data separator 1 to separate input digital video data of still pictures into luminance data and color-difference data; a video memory 2 to store the separated luminance data per pixel block of 8×8 pixels; an average calculator 3 to calculate an average of the luminance of the stored pixels to give a quantized integer; a pixel-luminance rewriter 4 to rewrite the luminance data of the stored pixels based on the quantized integer of the averaged luminance calculated by the average calculator 3; a R/W controller 5 to control reading/writing luminance data from/to the video memory 2; a data combiner 6 to combine the color-difference data separated by the data separator 1 and the luminance data processed at the video memory 2; and an encoder 7 to compress the digital video data combined at the data combiner 6 by JPEG irreversible compression.

The data processing apparatus encryptically encodes digital video data according to the following procedures:

Input digital video data is separated by the data separator 1 into luminance data and color-difference data. The luminance data is stored in the video memory 2 per pixel block of 8×8 pixels under control by the R/W controller 5. The sixty-four pixels have luminance values $L(i)$ [$i=1$ to 64] at gradation levels 256 as illustrated at the upper left section of FIG. 1, in this embodiment.

On completion of storing the luminance data in the video memory 2, the average calculator 3 calculates and rounds an average of the luminance $Lav$ ($=\Sigma L(i)/64$) for the 64 pixels to give a quantized integer $Lav'$.

The quantized integer $Lav'$ is sent to the pixel-luminance rewriter 4 which determines whether $Lav'$ is an even or an odd number.

If the integer $Lav'$ is an even number, the pixelluminance rewriter 4 sends a read command signal to the R/W controller 5. In response to this command, the controller 5 accesses the video memory 2 to read the luminance data.

On the contrary, if the integer $Lav'$ is an odd number, the pixel-luminance rewriter 4 sends a rewrite command signal to the R/W controller 5. In response to this command, the R/W controller 5 rewrites the luminance value $L(i)$ of each stored pixel, as follows:

In detail, the R/W controller 5 increases or decreases the luminance value $L(i)$ so that an average of the luminance becomes an even number ($Lav'+1$) or ($Lav'-1$) after rewriting. The amount of increase or decrease ($+\Delta p$ or $-\Delta m$) gives the least range of change in gradation. In other words, the luminance value $L(i)$ of each stored pixel is written so that the original video data is not modified as much as possible.

On completion of rewriting, the pixel-luminance rewriter 4 sends the read command signal to the R/W controller 5 to read the luminance data from the video memory 2.

Through this rewriting procedure, an average $\Sigma Le(i)/64$ of the luminance values $Le(i)$ [$i=1$ to 64] of the pixels read from the video memory 2 becomes an even number. Repetition of the rewriting procedure gives a rule to the luminance data per pixel block.

The luminance data read from the video memory 2 per pixel block are sent to the data combiner 6 and combined with the color-difference data separated at the data separator 1 per pixel block, thus a composite video data being produced.

The composite video data is sent to the encoder 7 and compressed with the following JPEG irreversible-compression algorism.

(1) DCT (Discrete Cosine Transform) transform the composite video data per pixel block at a DCT transformer 7a.

(2) Quantize DCT coefficients obtained at the DCT transformer 7a for DC and AC components, separately, at a quantizer 7b, using data stored in a quantization table 7c, to obtain DC and AC coefficients. And, (3) Encode the difference between a DC coefficient of the present pixel block and another DC coefficient (a predictor) of another pixel block immediately preceding the present pixel block at an entropy encoder 7d, using data stored in a coding table 7e, whereas encode the AC coefficients having many zeros at high spatial frequency by zigzag scanning the AC coefficients rearranged in each pixel block from low to high spatial frequency, at the entropy encoder 7d, using data stored in the quantization table 7e, thus producing compressed video data of a run of zeros followed by one or more nonzero values.

The compressed video data are once stored in memory and distributed as recorded on storage media or through a communications network.

Through the JPEG irreversible compression disclosed above, the AC components of the video data are varied whereas the DC components are not almost varied and maintaining the rule in that the average luminance $\Sigma Le(i)/64$ is an even number per pixel block. In other words, the JPEG irreversible compression gives almost no effects to the average luminance per pixel block because the majority of the luminance data exist in the low spatial frequency while the redundancy of high-frequency components of the luminance data is eliminated in the DCT transform.

The compressed video data may be tampered with before or during distribution through storage media or a communications network.

Figure 2:
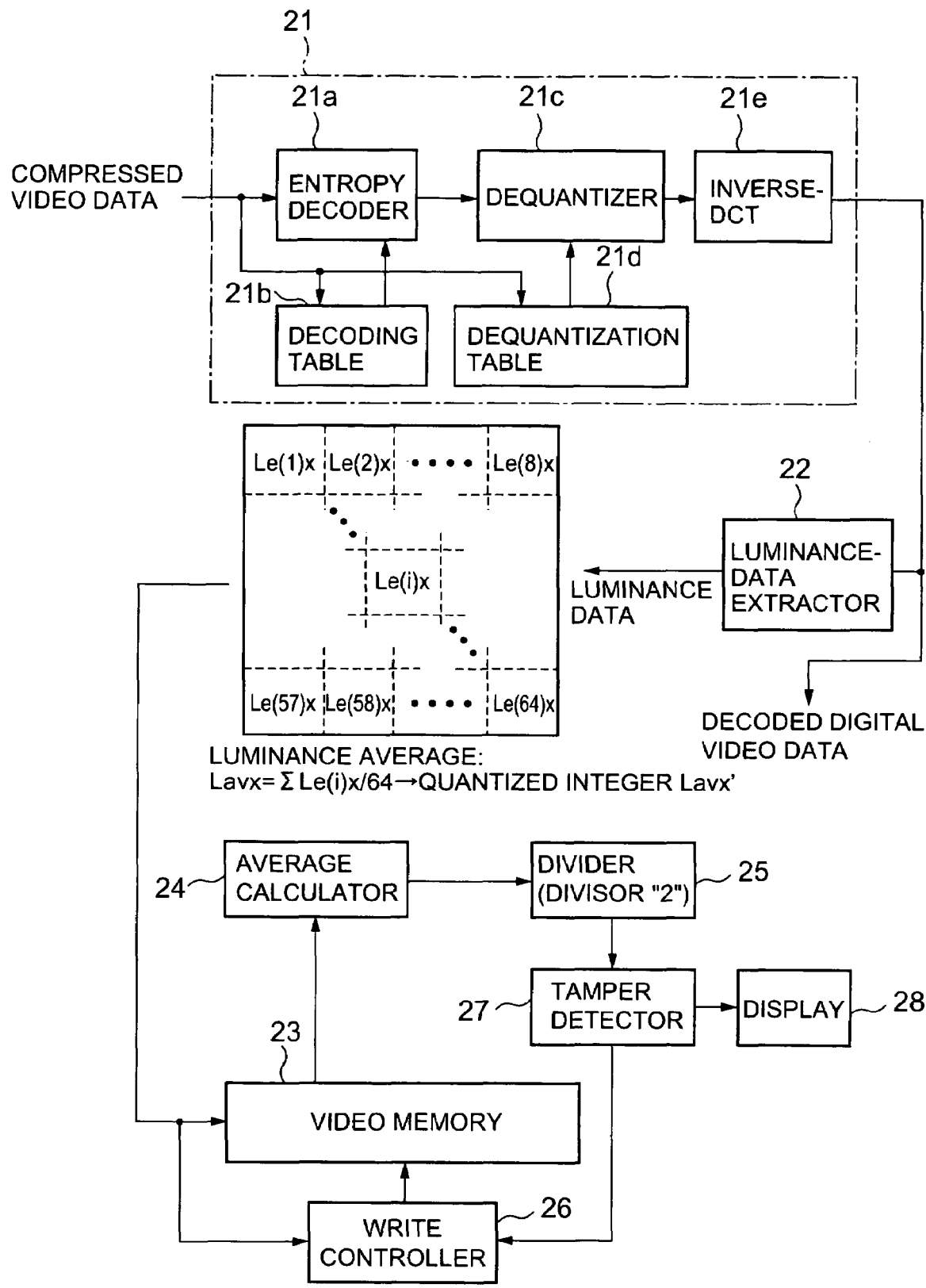
FIG. 2 shows a block diagram of a first embodiment of a tamper detection apparatus according to the present invention, compatible with the data processing apparatus shown in FIG. 1.

Disclosed next with reference to FIG. 2 is a first embodiment of a tamper detection apparatus according to the present invention, for determining whether or not compressed video data has been tampered with, which is compatible with the data processing apparatus shown in FIG. 1.

The tamper detection apparatus is equipped with: a decoder 21 to decode input compressed video data; a luminance-data extractor 22 to extract luminance data from the decoded video data; a video memory 23 to store the extracted luminance data per pixel block of 8×8 pixels; an average calculator 24 to calculate an average of the luminance of the stored pixels to give a quantized integer; a divider 25 to divide the average luminance (integer) by a divisor "2"; a write controller 26 to update the luminance data in the video memory 23 per pixel block; a tamper detector 27 to determine whether or not the video data has been tampered with, based on the results at the divider 25; and a display 28 to display the results of tamper detection.

The tamper detection apparatus decodes the input compressed video data with the following decoding algorism before determining whether it has been tampered with, which is the reverse algorism of that installed in the encoder 7 of the data processing apparatus shown in FIG. 1.

(1) Return the input compressed video data to quantized indices at an entropy decoder 21a, using data stored in a decoding table 21b.

(2) Dequantize the quantized indices at a dequantizer 21c, using data stored in a dequantization table 21d. And, (3) Reconstruct dequantized DCT coefficients as decoded video data at an inverse-DCT transformer 21e.

The decoded video data is sent to the luminance-data extractor 22 that extracts luminance data from the decoded video data.

The extracted luminance data is equal to that read from the video memory 2 of the data processing apparatus (FIG. 1) if the video data has not been tampered with before or during distribution through storage media or a communications network, or maintains the rule in that the average luminance $\Sigma Le(i)/64$ is an even number per pixel block. On the contrary, it has lost the rule if the video data has been tampered with.

The extracted luminance data has luminance values Lex(i) [i=1 to 64] for 64 pixels per pixel block, as illustrated in the middle section of FIG. 2, which might have or have not been tampered with.

The luminance data is stored in the video memory 23 per pixel block of 8×8 pixels under control by the write controller 26.

On completion of storing the luminance data in the video memory 23, the average calculator 24 calculates an average of the luminance Lavx ($=\Sigma Le(i)x/64$) of the luminance values Lex(i) [i=1 to 64] and rounding the average luminance Lavx to give a quantized integer Lavx'.

The quantized integer Lavx' is sent to the divider 25 and divided by the divisor "2". The remainder is "0" if the video data has not been tampered with because it maintains the rule in that the average luminance $\Sigma Le(i)/64$ is an even number per pixel block. In contrast, the remainder is "1" if the video data has been tampered with and the present pixel block is involved in the tampered zone.

The remainders of division are saved in a built-in memory (not shown) of the tamper detector 27 one by one for successive pixel blocks. For each save, the tamper detector 27 sends a command signal to the write controller 26 so that the controller 26 overwrites the luminance data of the present pixel block with that of the next pixel block. The average calculator 24 and the divider 25 repeat the procedures disclosed above.

On completion of these procedures for the input video data, the tamper detector 27 checks the saved remainders and determines that the video data has been tampered with if at least one remainder is "1" whereas it has not been tampered with if there is no remainder "1".

Figure 3:
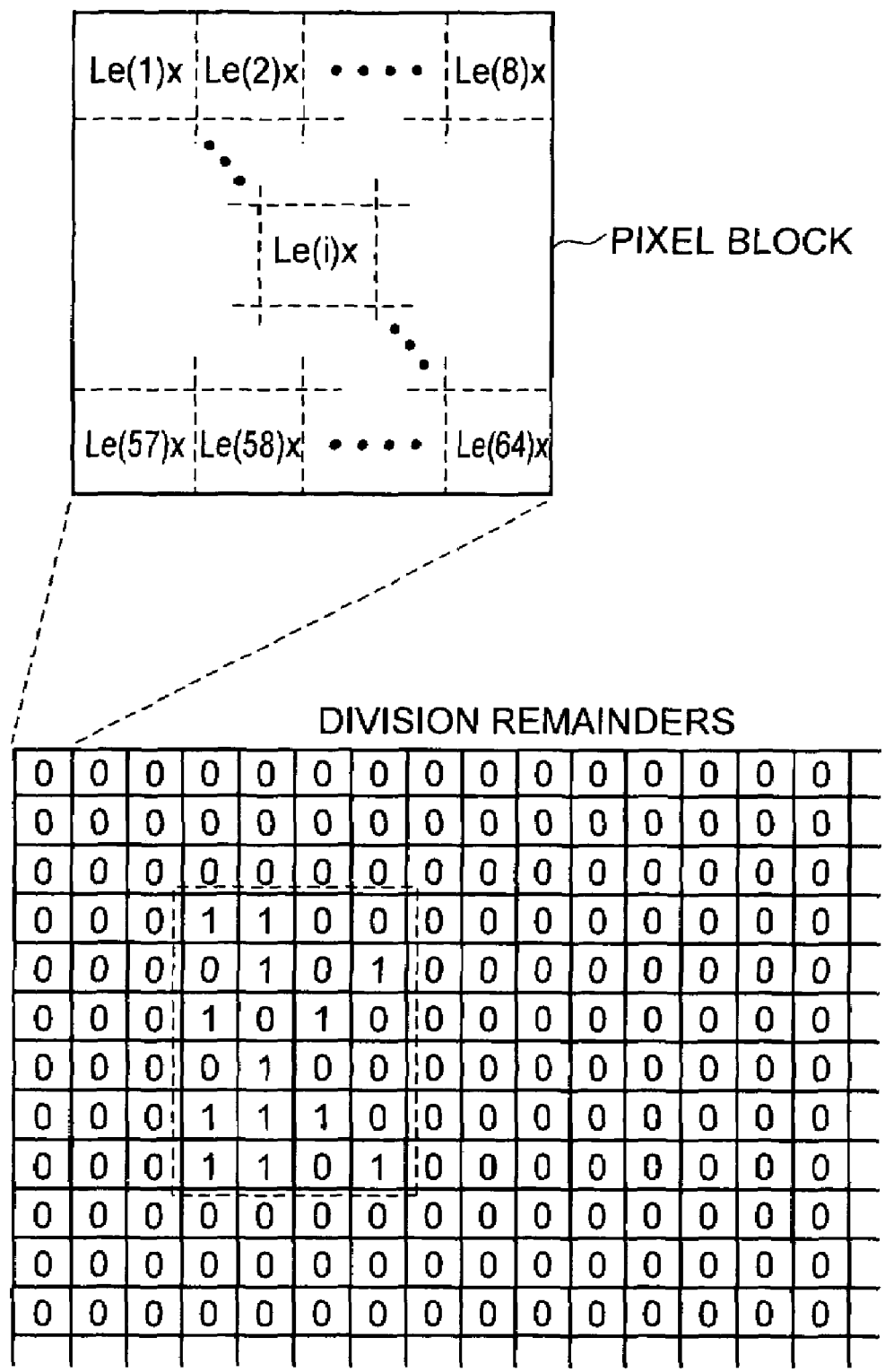
FIG. 3 illustrates exemplary reminders given by a division processing for multiple pixel blocks at the tamper detection apparatus shown in FIG. 2.

For example, if the reminders of division for multiple pixel blocks saved in the built-in memory of the tamper detector 27 are such as those illustrated in FIG. 3, it is determined that the video data has been tampered with because several remainders "1" are involved.

Each remainder shown in FIG. 3 is the result of division for one pixel block. Thus, the tampered zones of the video data can be indicated on the display 28 while the video data decoded by the decoder 21 is displayed thereon.

The tamper detector 27 may not necessarily save the reminders if it is only required to determine whether or not the video data has been tampered with. It determines that the video data has been tampered with when one reminder "1" is given.

The first embodiment uses the rule in that the average luminance $\Sigma Le(i)/64$ is an even number per pixel block Not only an even number, but any multiple of an integer of "2" or more can be used for determination of tempering in which the divider 25 uses that multiple for division.

Moreover, in this embodiment, not only the average function to give an average luminance per pixel block, but several types of functions that give a representative value per pixel block with luminance data as a parameter can be used for encryptically encoding digital video data.

Second Embodiment

Disclosed in the first embodiment are feasible ways of encryptically encoding digital video data and determining whether the video data has been tampered with, but having one fundamental requirement that the rule in that the average luminance $\Sigma Le(i)/64$ is an even number per pixel block is never lost through the encoding procedure at the data processing apparatus side and also decoding procedure at the temper detection apparatus side.

In encoding and decoding with orthogonal transform, however, DC components of video data may be changed. It could happen in the first embodiment that the rule given to each pixel block of vide data read from the video memory 2 is lost after the encoding procedure at the encoder 7 in FIG. 1 or the decoding procedure at the decoder 21 in FIG. 2. This results in that the luminance data extracted at the luminance-data extractor 22 does not maintain the rule even if the video data has not been tampered with. If the video data has been tampered with, double impacts of the encoding and decoding procedures and the tampering procedure are unavoidable.

The rule is lost thorough the encoding and decoding procedures for not so many pixel blocks, but over the entire video data at an almost constant ratio, which depends on the content of the data though.

The second embodiment disclosed below can accurately determine whether video data has been tampered with even if the rule is lost thorough the encoding and decoding procedures.

The difference in the data processing apparatus between the first and the second embodiment is that the former rewrites luminance data of each pixel so that the quantized integer Lav' of the average luminance Lav' per pixel block becomes a multiple of 2 whereas the latter rewrites it so that the quantized integer Lav' becomes a multiple of "4". Thus, the second embodiment of the data processing apparatus will not be disclosed for brevity.

Figure 4:
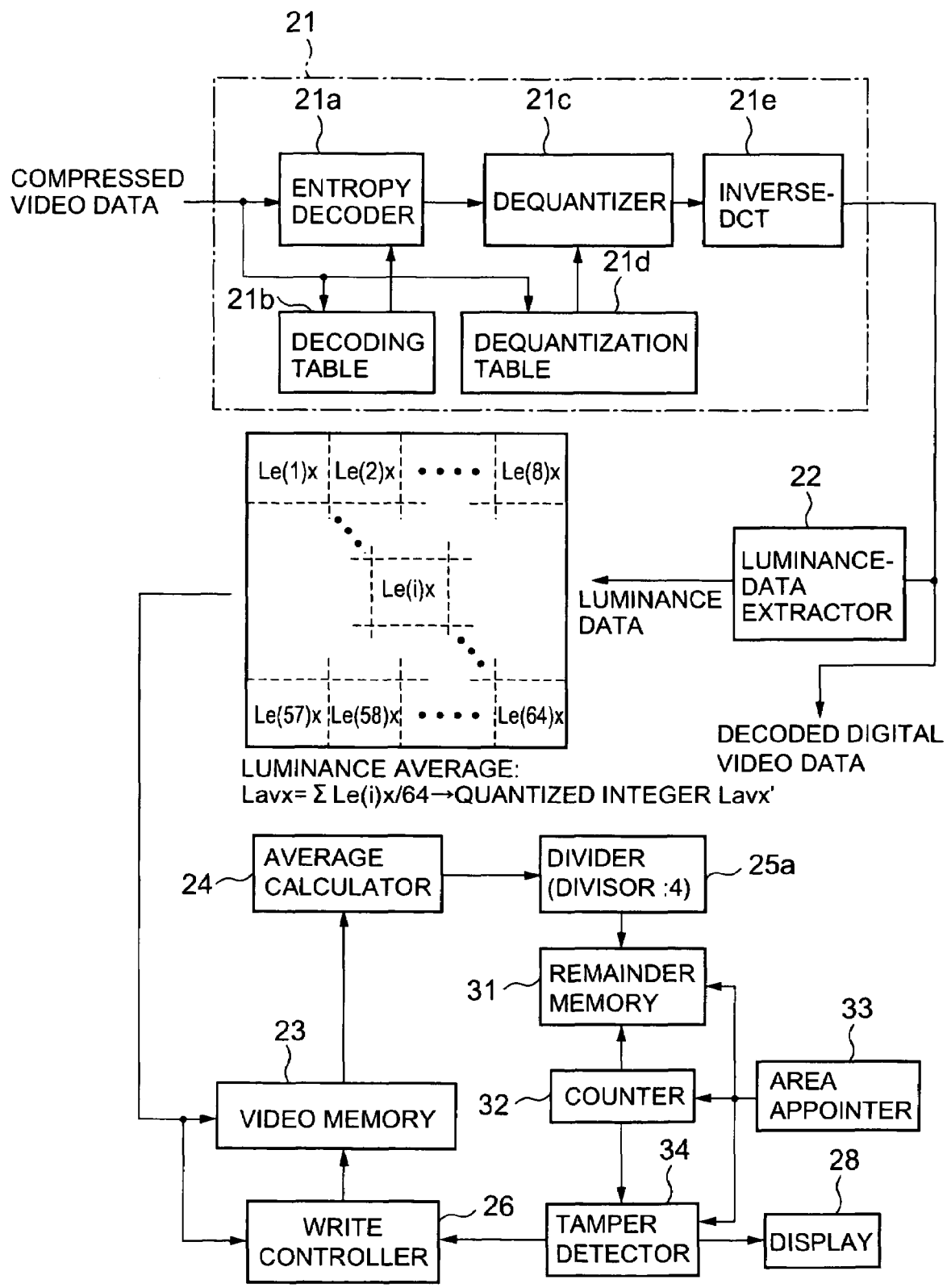
FIG. 4 shows a block diagram of a tamper detection apparatus for a second and a third embodiment according to the present invention.

Disclosed next with reference to FIG. 4 is a second embodiment of a tamper detection apparatus according to the present invention, for determining whether or not compressed video data has been tampered with, which is compatible with the second embodiment of the data processing apparatus.

A difference in the tamper detection apparatus between the first and the second embodiment is that the divider 25 (FIG. 2) in the former uses the divisor "2" whereas the counterpart (the divider) 25a (FIG. 4) in the latter uses a divisor "4" for dividing the average luminance.

Another difference in the tamper detection apparatus between the first and the second embodiment is that the latter is equipped with: a remainder memory 31 to store remainders given at the divider 25a through a division procedure; a counter 32 to count the number of remainders "0" and also the number of remainders "1", "2" and "3" among the remainders stored in the remainder memory 31; an area appointer 33 via which a user appoints a memory area in which remainders are stored (corresponding to a video zone to be determined whether it has been tampered with) to the remainder memory 31 and the counter 32; and a tamper detector 34 to determine whether video data has been tampered with by statically processing the counted numbers of the remainders.

The elements shown in FIG. 4 that are the same as or analogous to those shown in FIG. 2 are given the same reference numerals and not disclosed for brevity.

The tamper detection apparatus in the second embodiment performs the following tamper detecting procedures:

A quantized integer Lavx', given at the average calculator 24 by calculating and rounding an average of the luminance Lavx ($=\Sigma Le(i)x/64$) of the luminance values Le(i) [i=1 to 64] is divided by the divisor "4" at the divider 25$a$.

Remainders given at the divider 25$a$ are stored in the remainder memory 31 for one-frame video data. The user appoints the memory area, or remainders on a specific video zone in one frame via the areas appointer 33, the appointing information being sent to the counter 32 and the tamper detector 34. The counter 32 counts the number of remainders "0" and also the number of remainders "1", "2" and "3" among those stored in the remainder memory 31.

The area appointments can be performed for each of several areas for remainder groups on one-frame vide data or any zone of video data decoded at the decoder 21 and displayed on the display 28.

The tamper detector 34 calculates A/(A+B) where A and B are the number of the remainders "0" and that of other remainders, respectively, and compares the result and a threshold value Z1 to determine that the video data has been tampered with if A/(A+B)$\leq$Z1 whereas it has not been tampered with if A/(A+B)>z1.

The threshold value Z1 is set at a value larger than ¼ (Z1 being larger than 1/N, N being the divisor equal to the integer used in the data processing apparatus) that is roughly equal to a value obtained by A/(A+B) for video data that has not given any rule discussed above, or the number of remainders is almost equal over the remainders "0", "1", "2", and "3" at the divider 25$a$, which means almost the entire video data is tampered with.

Determined next is how much the rule is lost through the encoding and decoding procedures.

This determination is made based on what remainders are given at the divider 25$a$ when video data, that has been processed by the data processing apparatus in the second embodiment but has not been tampered with, is input to the tamper detection apparatus shown in FIG. 4.

The value is about ⅘ for A/(A+B) depending on the content of video data if the encoder 7 and the decoder 21 are a JPEG encoder and also a JPEG decoder, respectively.

Figure 5:
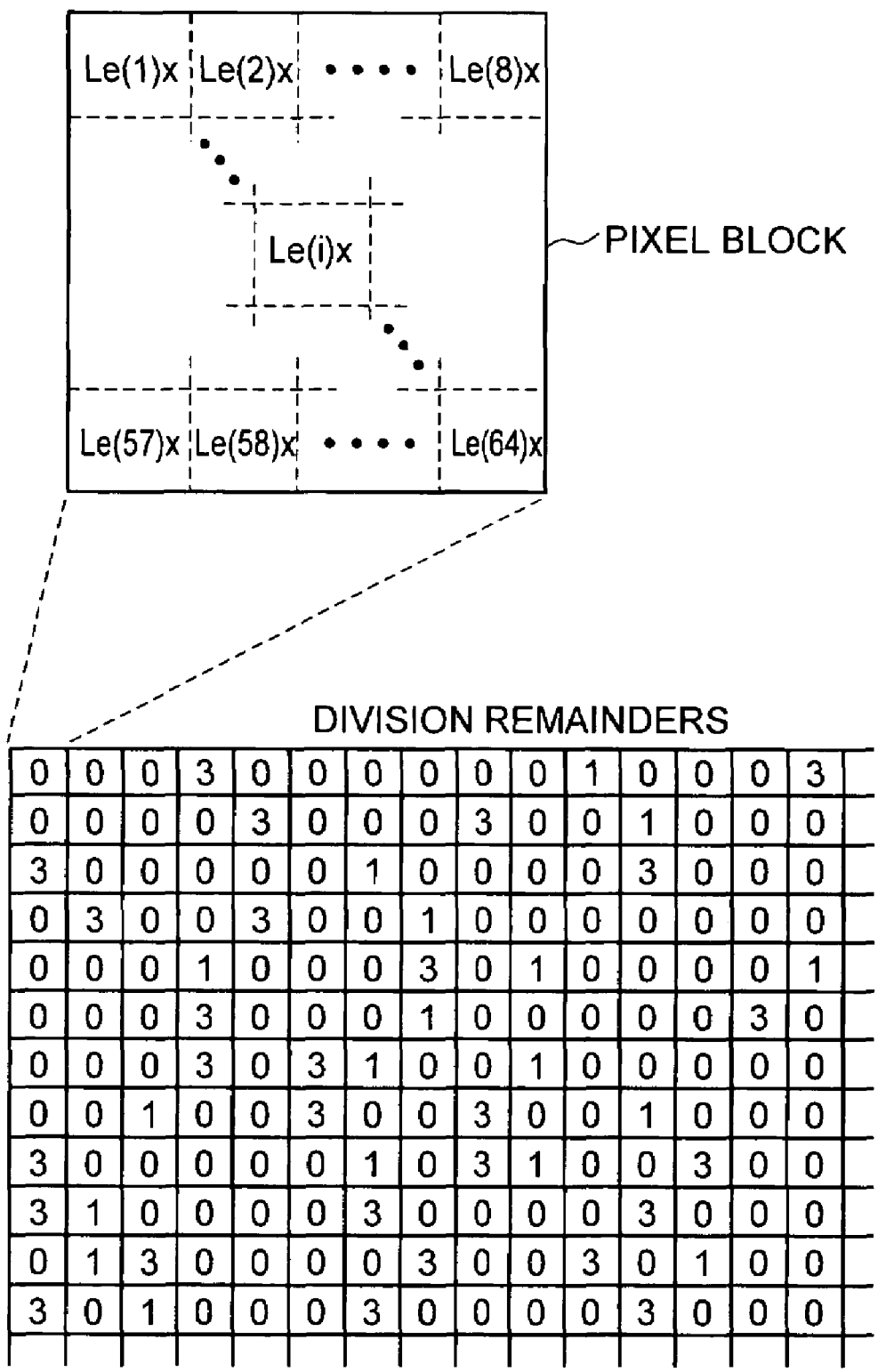

For example, the value is 0.79 for A/(A+B), as illustrated in FIG. 5 in which the remainders "0", "1", and "3" are given at the divider 25$a$ and stored in the remainder memory 31. The illustration indicates that the rule given to each pixel block before encoding at the data processing apparatus has been lost by 20% of the entire video data through the encoding and decoding procedures. No remainder "2" is given in FIG. 5 which means that the encoding and decoding procedures have given small effects to the luminance data so that the luminance data has not changed so much to give the remainder "2".

The illustration teaches that pixel blocks for which the rule has been lost are about 20% on any zone of the video data, the percentage depending on the characteristics of the encoder 7 and the decoder 21.

Discussed next is that video data has been tampered with. No prediction is possible on which zone of video data has been tampered with. In addition, the tamper detection apparatus in this embodiment statistically determines how much the rule has been lost for video data. This causes variation in A/(A+B) in accordance with the relative relationship between a predicted size of tampered data zone and a size of appointed data zone to be subjected to tamper detection. Thus, the threshold value Z1 is required to be selected in accordance with the relative relationship.

As discussed above, the threshold value Z1 is determined with parameters of, at least, the characteristics of the encoder 7 of the data processing apparatus and the decoder 21 of the tamper detection apparatus, and the relative relationship between a predicted size of tapered data zone and a size of appointed zone.

The characteristics of the encoder 7 and the decoder 21 can be experimentally given as illustrated in FIG. 5. In contrast, the data zone to be subjected to tamper detection is appointed by a user under consideration of the predicted size of tampered data zone, for the relative relationship. Thus, the threshold value Z1 can be set at the temper detector 34 in accordance with the characteristics and the size of appointed data zone.

Third Embodiment

The third embodiment disclosed below can accurately determine whether video data has been tampered with even if the rule is lost thorough the encoding and decoding procedures, like the second embodiment.

The differences between the second and the third embodiment are the functions of the counter 32 and the tamper detector 34, hence explanation of the other elements and the drawing are omitted for brevity.

In the third embodiment, when remainders given at the divider 25$a$ are stored in the remainder memory 31 and the user appoints a memory area, in which the remainders are stored, which corresponds to a data zone to be subjected to tamper detection via the area appointer 33, the counter 32 counts the number of remainders "0" and that of remainders "2" corresponding to the data zone to be subjected to tamper detection.

The tamper detector 34 calculates A/(A+C) where A and C are the number of the remainders "0" and that of the remainders "2", respectively, and compares the result and a threshold value Z to determine that video data has been tampered with if A/(A+C)$\leq$Z2 whereas it has not been tampered with if A/(A+C)>z2.

The second embodiment employs the tamper criteria A/(A+B)$\leq$Z1 where A and B are the number of the remainders 0 and that of other remainders, respectively. In contrast, the third embodiment employs tamper criteria A/(A+C)$\leq$Z2 where A is the number of the remainders "0" and C is that of the remainders "2", the median among the integers between "0" to "4", with the threshold value Z2 larger than the threshold value Z1.

As discussed in the second embodiment, the remainders given when the rule for video data is lost through encoding and decoding procedures are mostly "0" and "3". In other words, the remainders "2", are rarely given.

When video data has been tampered with, the remainders "1", "3" and also "2", are increased whereas the reminders "0" are extremely decreased. Thus, the rate of decrease in A/(A+C) in the third embodiment is extremely higher than that in A/(A+B) in the second embodiment.

Therefore, the third embodiment uses the threshold value Z2 (larger than 1/N, N being divisor equal to the integer used in the data processing apparatus) larger than Z1 (the second embodiment), such as, 0.9 to 0.995 for further accurate tamper detection.

Figure 6:
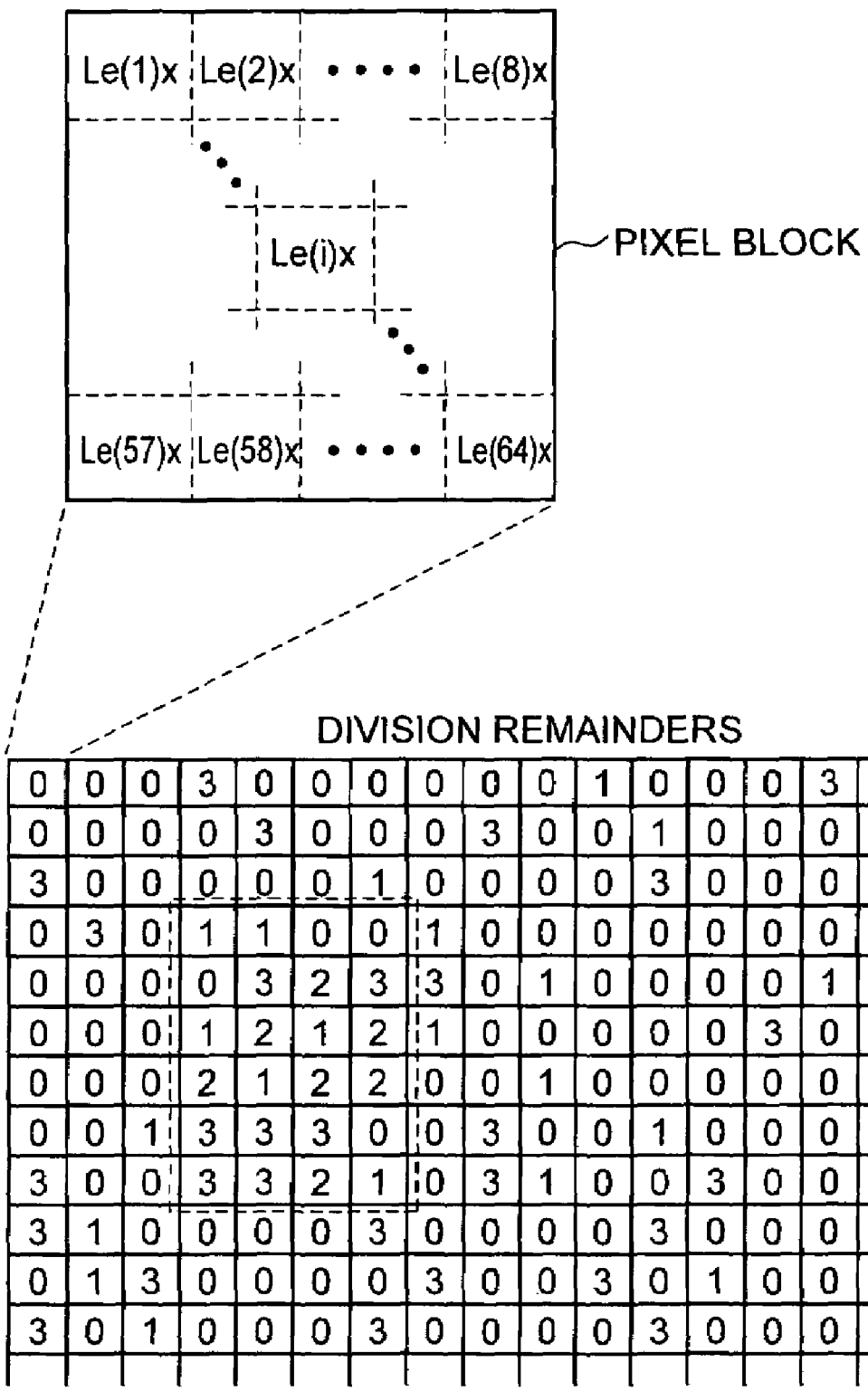

Illustrated in FIG. 6 are remainders given at the divider 25a, with a tampered video-data zone surrounded by dot lines. There are several remainders "2" in the tampered video-data zone, which are not shown in FIG. 5 for the video data that has not been tampered with. In FIG. 5, A/(A+C)=1 due to no remainders "2" being given. In contrast, In FIG. 6, A/(A+C) is extremely is small when the tampered video-data zone is appointed, because A=4 and C=6 give A/(A+C)=0.4.

As discussed above, the third embodiment offers further accurate tamper detection than the second embodiment.

The third embodiment gives the rule to video data at the data processing apparatus so that the quantized integer Lavx becomes a multiple of "4" and uses the divisor "4" at the divider 25a of the tamper detection apparatus, with the remainder "2", the median among the integers between "0", to "4", for tamper detection.

The divisor for tamper detection may, however, be any multiple larger than "4", such as "5", with remainders "2" and "3", two median integers among the integers between "0" to "5", both remainders being used for giving the counted number C when an odd number such as "5" is used. The probability of giving the remainders "2" and "3" is very low when the divisor is set at "5" unless video data has not been tampered with. This probability becomes lower as the divisor is set at any odd number larger than "5".

Fourth Embodiment

Disclosed in the fourth embodiment are data-processing and tamper-detection software corresponding to the first to third embodiments.

Figure 7:
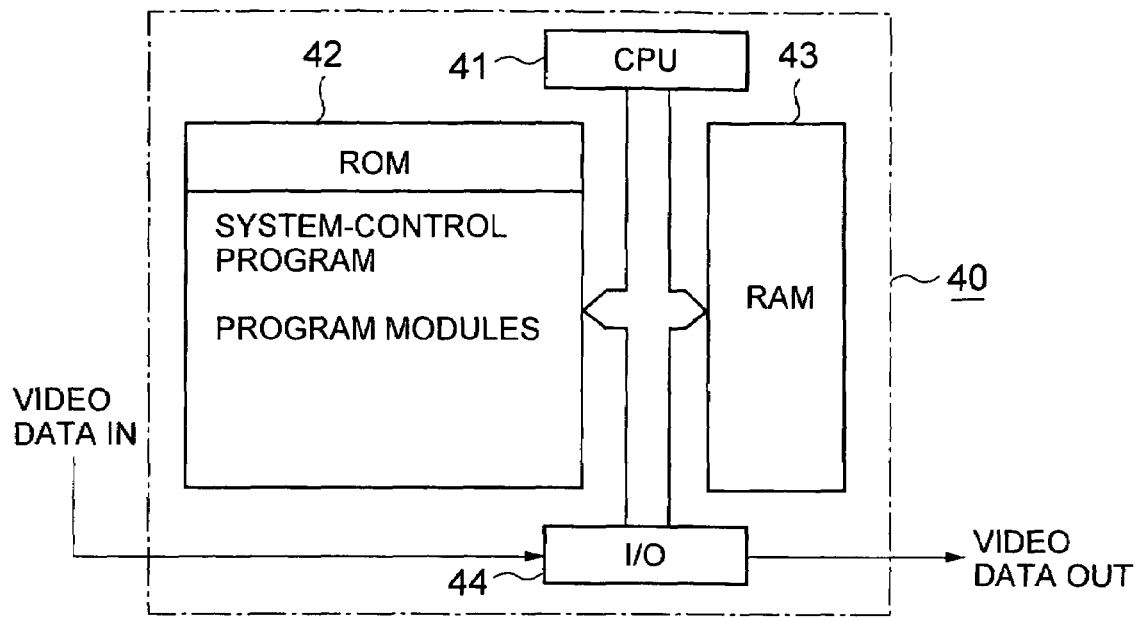
FIG. 7 shows a block diagram of a microcomputer in which data-processing software is installed, as a fourth embodiment according to the present invention.

FIG. 7 shows a block diagram of a microcomputer 40 in which data-processing software is installed. The microcomputer 40 is equipped with a CPU 41, a ROM 42, a RAM 43 and an I/0 port 44.

Installed in the ROM 42 are a system-control program and also program modules that correspond to the functional procedures performed by the data separator 1, the average calculator 3, the pixel-luminance rewriter 4, the R/W controller 5, the data combiner 6, and the encoder 7, shown in FIG. 1 (the first or the second embodiment).

The CPU 41 executes the program modules while using the RAM 43 as a video memory and a working area.

Figure 8:
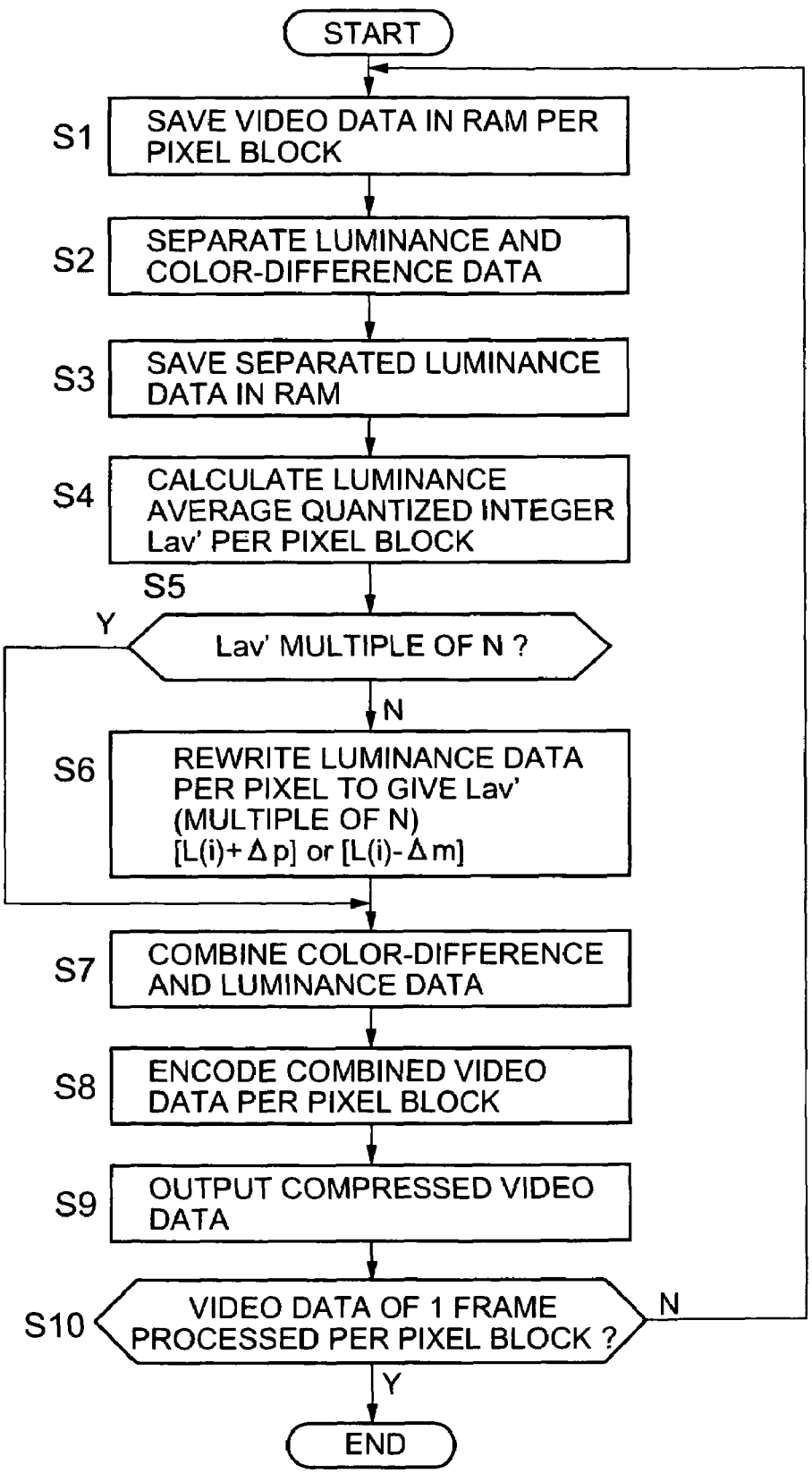
FIG. 8 shows a flowchart of program modules installed in the microcomputer shown in FIG. 7.

Disclosed with reference to a flowchart shown in FIG. 8 are the program modules installed in the ROM 42 executed sequentially for data processing.

Step S1 to S3: Digital video data is input through the I/O port 44 per 8×8 pixel block. The video data is once saved in the RAM 43. A luminance/color-difference data separation module installed in the ROM 42 is executed to separate luminance and color-difference data from the video data. The separated luminance data is saved again in the RAM 43.

Step S4: A luminance-average quantized-integer calculation module installed in the ROM 42 is executed to calculate and round an average of the luminance Lav ($=\Sigma L(i)/64$) of the stored pixels per pixel block to give a quantized integer Lav'.

Step S5: A luminance-data rewrite module installed in the ROM 42 is executed to determine whether the quantized integer Lav' is a multiple of an integer N (N being 2 or 4). If YES in step S5, the sequence jumps to step S7 whereas, if NO, moves to step S6.

Step S6: The luminance data of each pixel in one pixel block is rewritten with the amount ($+\Delta p$ or $-\Delta m$) that gives the least range of change in gradation so that the quantized integer Lav' becomes a multiple of N. The pixel block is thus given the rule in that the average luminance is a multiple of N.

Step S7 to S9: On completion of luminance-data processing, a luminance/color-difference data combining module stored in the ROM 42 is executed to combine the luminance data and the color-difference data, and then a JPEG encoding module stored in the ROM 42 is executed to encode the combined video data per pixel block, the compressed video data being output via the I/O port 44.

Step S10: It is determined whether video data of one frame has been processed per pixel block. If YES, the sequence ends whereas, if NO, goes back to steps S1 to repeat the procedures through step S1 to S9 until video data of one frame is processed and output.

The output encoded and compressed video data is once stored in memory and distributed through storage media or a communications network.

Figure 9:
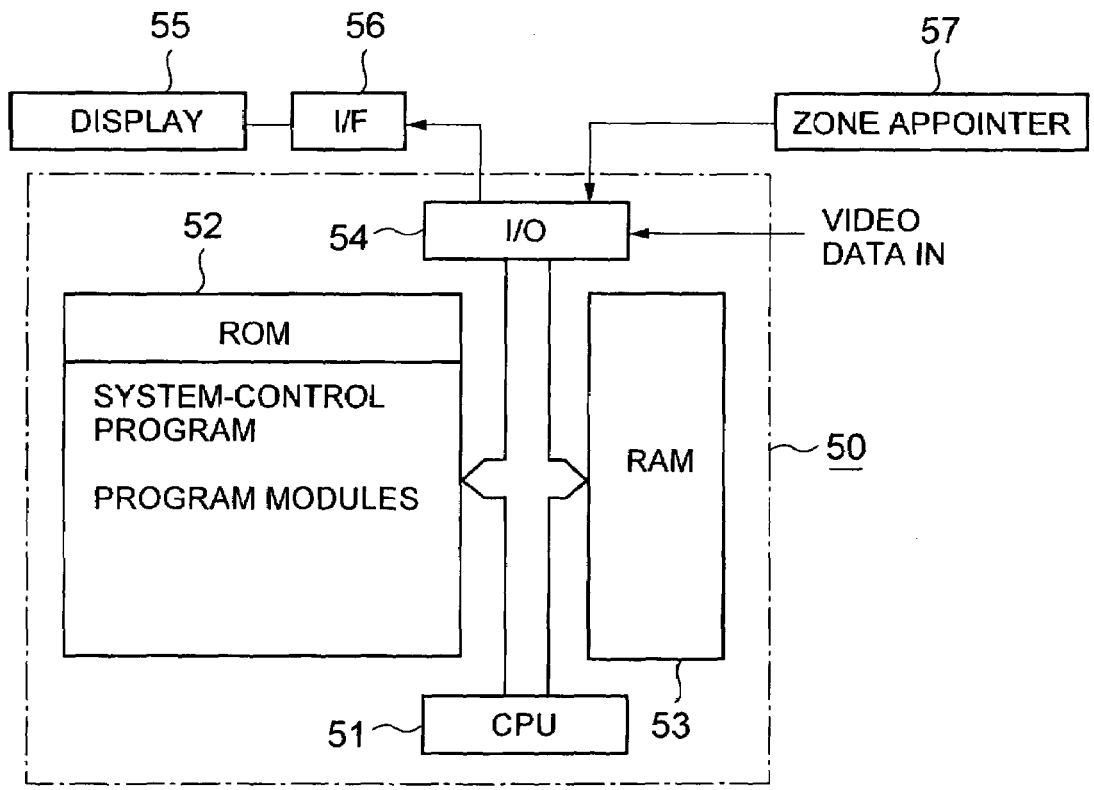
FIG. 9 shows a block diagram of a microcomputer in which tamper-detection software is installed, as the fourth embodiment according to the present invention.

FIG. 9 shows a block diagram of a microcomputer 50 in which tamper-detection software is installed. The microcomputer 50 is equipped with a CPU 51, a ROM 52, a RAM 53 and an I/O port 54. Connected to the I/O port 54 are a display 55 via an interface I/F 56 and also a zone appointer 57 for appointing a video zone to be subjected to tamper detection.

Installed in the ROM 52 are a system-control program and also program modules that correspond to the functional procedures performed by the decoder 21, the luminance-data extractor 22, the average calculator 24, the divider 25, the write controller 26, the taper detector 27, shown in FIG. 2 (the first embodiment), and further the counter 32 and the taper detector 34, shown in FIG. 4 (the second embodiment).

The CPU 51 executes the program modules while using the RAM 53 as a video memory and a working area.

Figure 10:
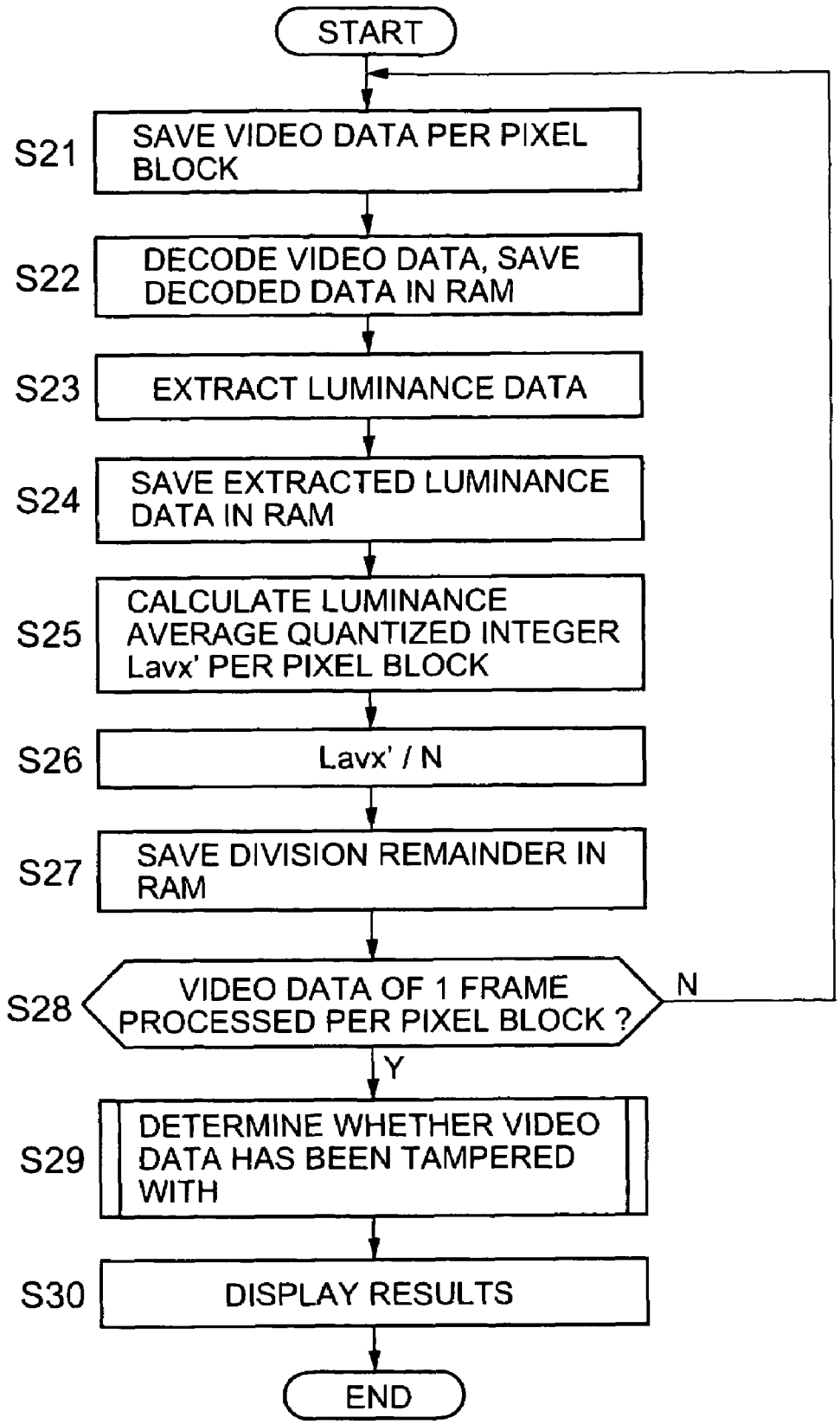
FIG. 10 shows an overall flowchart of program modules installed in the microcomputer shown in FIG. 9.

Disclosed with reference to a flowchart shown in FIG. 10 are the program modules installed in the ROM 52 executed sequentially for tamper detection.

Step S21, S22: Digital video data is input through the I/O port 54 per pixel block. The video data is once saved in the RAM 53. A JPEG decoding module installed in the ROM 52 is executed to decode the video data. The decoded video data is saved again in the RAM 53.

Step S23, S24: A luminance-data extraction module installed in the ROM 52 is executed to extract luminance data from the decoded video data. The separated luminance data is saved again in the RAM 53.

Step S25: A luminance-average quantized-integer calculation module installed in the ROM 52 is executed to calculate and round an average of the luminance Lavx ($=\Sigma L(i) \times /64$) of each stored pixel to give a quantized integer Lavx'.

Step S26, S27: A division module installed in the ROM 52 is executed to divide the quantized integer Lavx' by a divisor that is an integer N (N being 2 or 4 used in Step S5 of the data-processing procedures), a remainder of division being stored in the RAM 53.

Step S28: It is determined whether video data of one frame has been processed per pixel block. If YES, the sequence goes to step S29 whereas, if NO, goes back to steps S21 to repeat the procedures through steps S21 to S27 until the remainders of division for video data of one frame are given and stored in the RAM 53.

Step S29: One of the following three types of tamper-detection procedures is executed in accordance with N (divisor) and tamper-criteria settings as disclosed in the first to third embodiments.

Figure 11:
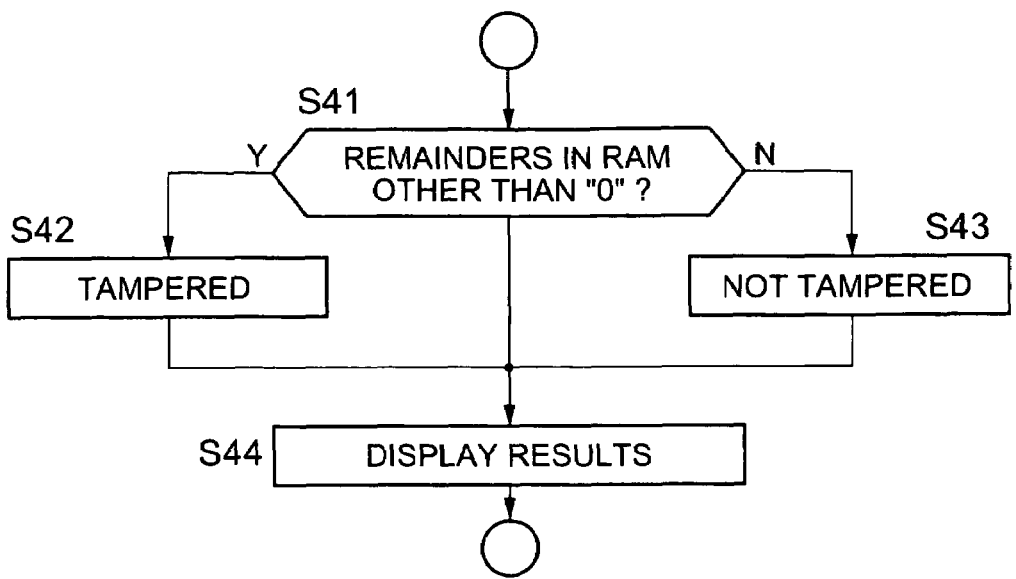
FIG. 11 shows a flowchart of a tamper-detection procedure I installed in the microcomputer shown in FIG. 9.

Tamper-Detection Procedure I:

The procedure I shown in FIG. 11 corresponds to the first embodiment with the fundamental requirement that the rule given to each pixel block is never lost through the encoding procedure and decoding procedure in the data processing and the tamper-detection processing, respectively.

Step S41: A tamper-detection module stored in the ROM 52 is executed so that the CPU 51 searches for remainders stored in the RAM 53 other than the remainders "0".

Step S42: If YES in step S41, or if there is at least one remainder other than the remainders "0", it is determined that the video data has been tampered with.

Step S43: If NO in step S41, or if all the remainders stored in the RAM 52 are the remainders "0", it is determined that the video data has not been tampered with.

Step S44: The results of tamper detection is sent from the I/O port 54 to the display 55 via the interface 56.

Figure 12:
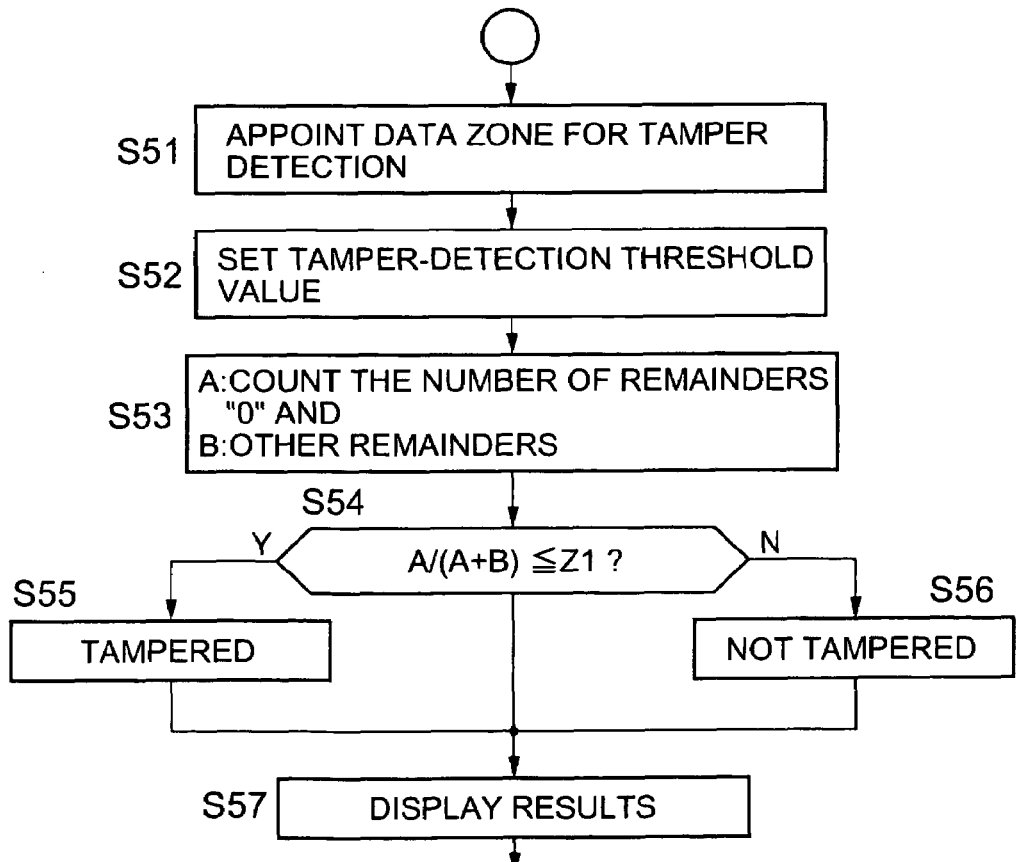
FIG. 12 shows a flowchart of a tamper-detection procedure II installed in the microcomputer shown in FIG. 9.

Tamper-Detection Procedure II:

The procedure 11 shown in FIG. 12 corresponds to the second embodiment in which the rule given to each pixel block might have been lost through the encoding procedure and decoding procedure in the data processing and the tamper-detection processing, respectively.

Step S51, S52: A data zone to be subjected to tamper detection is set by a user at the zone appointer 57. A tamper-detection threshold-value setting module stored in the ROM 52 is executed to set the threshold value Z1 at an optimum value, such as 0.85, in accordance with the relative relationship between a predicted size of tapered data zone and a size of the data zone appointed at the zone appointer 57. In detail, the tamper-detection threshold-value setting module reads an optimum value from an installed look-up table having threshold values Z1 with the above relative relationship as the parameter based on the zone-appointing information from the zone appointer 57.

Step S53: A remainder-counting module stored in the ROM 52 is executed to count the number A of the remainders "0" and also the number B of the other remainders stored in the RAM 53.

Step S54: On completion of the procedure of counting the number of remainders, a tamper-detection module stored in the ROM 52 is executed to calculate $A/(A+B)$ and compare this with the threshold value Z1, thus determining whether or not the video data has been tampered, using the tamper criteria $A/(A+B) \leq Z1$.

Step S55: If YES in step S54, or $A/(A+B)$ is equal to or smaller than Z1 (the tamper criteria is met), it is determined that the video data has been tampered with.

Step S56: If NO in step S54, or $A/(A+B)$ is larger than Z1 (the tamper criteria is not met), it is determined that the video data has not been tampered with.

Step S57: The results of tamper detection is sent from the I/O port 54 to the display 55 via the interface 56.

Figure 13:
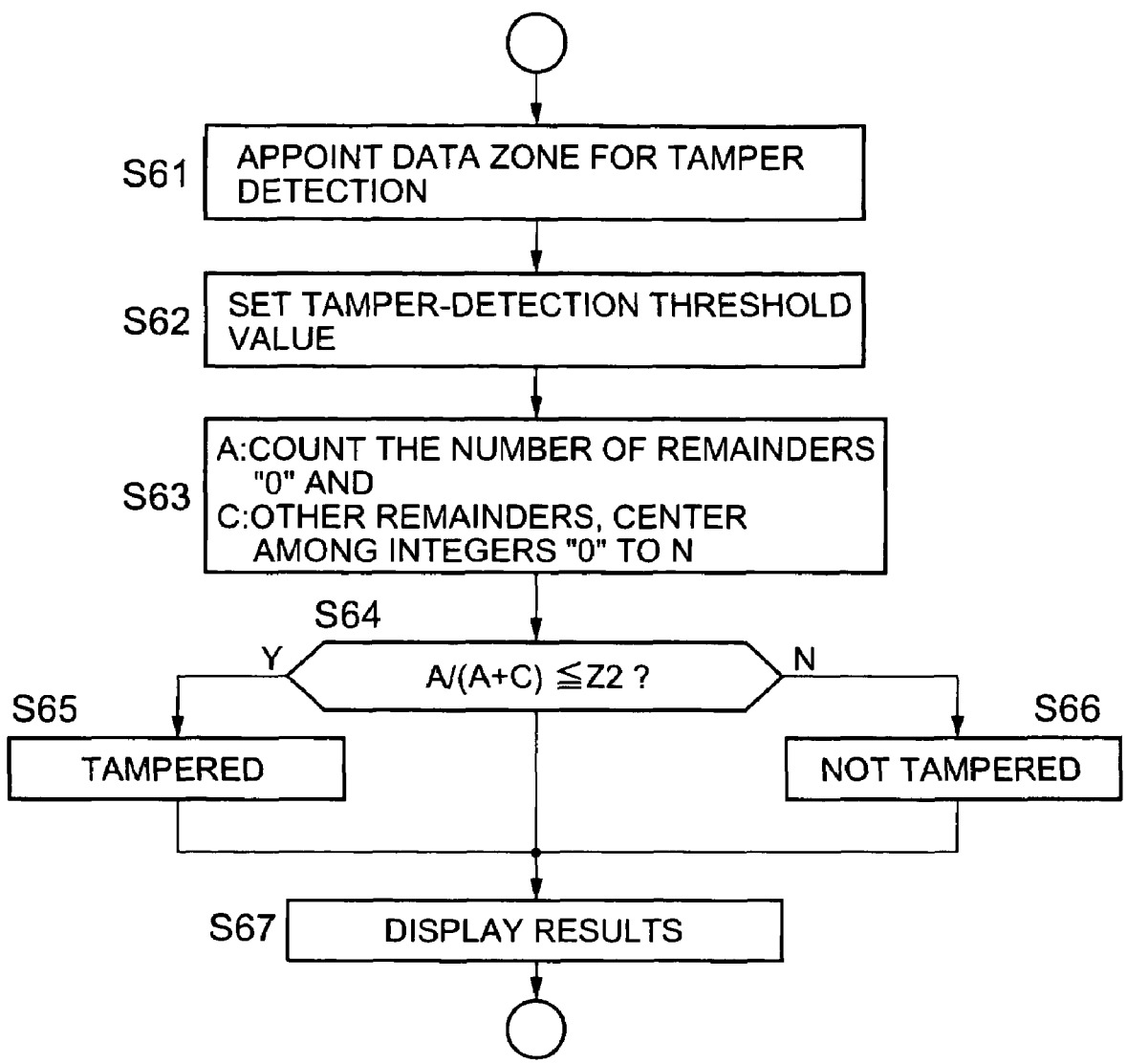
FIG. 13 shows a flowchart of a tamper-detection procedure III installed in the microcomputer shown in FIG. 9.

Tamper-Detection Procedure III:

The procedure III shown in FIG. 13 corresponds to the third embodiment in which the rule given to each pixel block might have been lost through the encoding procedure and decoding procedure in the data processing and the tamper-detection processing, respectively, like the procedure 11.

Step S61, S62: A data zone to be subjected to tamper detection is set by a user at the zone appointer 57. A tamper-detection threshold-value setting module stored in the ROM 52 is executed to set the threshold value Z2 at an optimum value, such as 0.95, in accordance with the relative relationship between a predicted size of tapered data zone and a size of the data zone appointed at the zone appointer 57, like the procedure 11. The threshold value Z2 is, however, set at a value larger than the threshold value Z1 due to the difference in remainder-counting module between the procedures II and III.

Step S63: A remainder-counting module stored in the ROM 52 is executed to count the number A of the remainders "0" and also the number C of the remainders, each being the median among the integers between 0 to N. If the set integer N is "4", the number of the remainders "2" is counted as C.

Step S64: On completion of the procedure of counting the number of remainders, a tamper-detection module stored in the ROM 52 is executed to calculate $A/(A+C)$ and compare this with the threshold value Z2, thus determining whether or not the video data has been tampered, using the tamper criteria $A/(A+C) \leq Z2$.

Step S65: If YES in step S64, or $A/(A+C)$ is equal to or smaller than Z2 (the tamper criteria is met), it is determined that the video data has been tampered with.

Step S66: If NO in step S64, or $A/(A+C)$ is larger than Z2 (the tamper criteria is not met), it is determined that the video data has not been tampered with.

Step S67: The results of tamper detection is sent from the I/O port 54 to the display 55 via the interface 56.

The sequence then goes to step S30 shown in FIG. 10 to display the results of the tamper-detection procedure I, II or III on the display 55.

As disclosed above, according to the forth embodiment: input video data is decoded by the JPEG decoding module; a tampered data zone can be appointed in the tamper-detection procedure I (as disclosed in the first embodiment); and the zone-appointing information is given in the tamper-detection procedures II and III.

Therefore, a tampered data zone and/or whether or not an appointed data zone has been tampered with can be displayed on the display 55 while decoded video data is being displayed thereon.

Moreover, in the fourth embodiment, a tamper-detection criteria selection mode can be installed in the microcomputer 50 (FIG. 9) so that the tamper-detection procedures I to III can be selectively executed.

The data-processing and tamper-detection software in the fourth embodiment can be installed in the computers 40 and 50 (FIGS. 7 and 9), respectively, via a storage medium or a communications network, such as the Internet.

Video data is processed per 8×8 pixel block in the foregoing embodiments. However, it can be processed per any unit of pixel block, such as, 16×16 pixel block.

Furthermore, video data processed in the foregoing embodiments is subjected to JPEG encoding and decoding procedures. Not only that, the present invention is applicable to moving-picture video data subjected to MPEG encoding and decoding procedures. For such moving-picture video data, the rule discussed in the foregoing embodiments can be given to the intraframes (I-frames) only. This is because the rule is almost not lost from the I-frames by intraframe coding whereas it is lost very much from predicted frames (P-frames) and bidirectional frames (B-frames) by interframe coding.

The temper detection apparatus in the foregoing embodiments are equipped with the video memory 23 (FIGS. 2 and 4) for storing luminance data of pixels per pixel block. However, since video data is not rewritten in the temper detection apparatus, luminance values of pixels can be sequentially detected from the luminance data for calculation of an average luminance value, thus the video memory being not required.

What is claimed is:

1. An apparatus for encryptically processing digital video data, followed by an encoding procedure to the processed digital video data with orthogonal transform to produce a coded video signal, the apparatus comprising:
   a representative-value calculator to obtain a representative value of luminance data of a plurality of pixels of the digital video data for each of pixel blocks having a predetermined number of pixels, each pixel block corresponding to a unit of data subjected to the encoding procedure, as a quantized integer for each pixel block by using a specific function with the stored luminance data as a parameter;
   a data rewriter to determine whether the quantized integer of the representative value for each pixel block is a multiple of a preset integer N of two or larger, and, if not, rewrite the stored luminance data with a specific requirement giving the least range of change in gradation so that the quantized integer becomes a multiple of the integer N, whereas the stored luminance data remain unchanged if the quantized integer is a multiple of the integer N, thus encryptically processing the digital video data; and
   an encoder to encode the encryptically processed digital video data with orthogonal transform to produce a coded video signal.

2. An apparatus for determining whether digital video data has been tampered with, the apparatus comprising:
   a decoder to decode a coded video signal produced by obtaining a first representative value of luminance data of a plurality of pixels of digital video data for each of pixel blocks, as a quantized integer for each pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal;
   a representative-value calculator to obtain a second representative value of the luminance data of the decoded video signal as a quantized integer for each pixel block by using the specific function with the luminance data as the parameter;
   a divider to divide the quantized integer of the second representative value by the integer N; and
   a tamper detector to determine that the video data has been tampered with when remainders of division meet predetermined tamer criteria.

3. The apparatus for determining whether digital video data has been tampered with according to claim 2, wherein the division is performed for all the pixel blocks to obtain remainders, the tamper detector determining that the video data has been tampered with when at least one remainder other than zero is found among the remainders for one pixel block of the video data.

4. The apparatus for determining whether digital video data has been tampered with according to claim 2 further comprising a calculator to count the number of remainders given by the divider, the remainders corresponding to a video zone of a specific size, the tamper detector determining that the video data has been tampered with in the video zone of the specific size when tamper criteria $A/(A+B) \leq Z1$ is met, where A and B are the number of remainders zeros and other remainders, respectively, among the remainders given by the divider, and $Z1$ is a preset value larger than $1/N$.

5. The apparatus for determining whether digital video data has been tampered with according to claim 2, wherein the integer N is four or larger, the apparatus further comprising a calculator to count the number of remainders given by the divider, the remainders corresponding to a video zone of a specific size, the tamper detector determining that the video data has been tampered with in the video zone of the specific size when tamper criteria $A/(A+C) \leq Z2$ is met, where A is the number of remainders zeros among the remainders given by the divider and C is the number of remainders among the remainders given by the divider but each being a median from among zero to the integer N, and Z is a preset value larger than $1/N$, the remainders to be counted as the number C being two integers most close to the integer N when the integer N is an odd number.

6. An apparatus for determining whether digital video data has been tampered with, the apparatus comprising:
   a decoder to decode a coded video signal produced by obtaining a first representative value of luminance data of a plurality of pixels of digital video data for each of pixel blocks, as a quantized integer for each pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal;
   a representative-value calculator to obtain a second representative value of the luminance data of the decoded video signal as a quantized integer for each pixel block by using the specific function with the luminance data as the parameter;
   a divider to divide the quantized integer of the second representative value by the integer N, the division being performed for all the pixel blocks to obtain remainders; and
   a tamper detector to determine that the video data has been tampered with when at least one remainder other than zero is found among the remainders for one pixel block of the video data.

7. An apparatus for determining whether digital video data has been tampered with, the apparatus comprising:
   a decoder to decode a coded video signal produced by obtaining a first representative value of luminance data of a plurality of pixels of digital video data for each of pixel blocks, as a quantized integer per pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform to produce the coded signal;

a representative-value calculator to obtain a second representative value of the luminance data of the decoded video signal as a quantized integer for each pixel block by using the specific function with the luminance data as the parameter;

a divider to divide the quantized integer of the second representative value by the integer N;

a calculator to count the number of remainders given by the divider, the remainders corresponding to a video zone of a specific size; and a tamper detector to determine that the video data has been tampered with in the video zone of the specific size when tamper criteria $A/(A+B) \leq Z1$ is met, where A and B are the number of remainders zeros and other remainders, respectively, among the remainders given by the divider, and Z1 is a preset value larger than 1/N.

8. An apparatus for determining whether digital video data has been tampered with, the apparatus comprising:

a decoder to decode a coded video signal produced by obtaining a first representative value of luminance data of a plurality of pixels of digital video data for each of pixel blocks, as a quantized integer per pixel block by using a specific function with the luminance data as a parameter, rewriting the luminance data with a specific requirement giving the least range of change in gradation so that the quantized integer of the first representative value becomes a multiple of an integer N of four or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal;

a representative-value calculator to obtain a second representative value of the luminance data of the decoded signal as a quantized integer for each pixel block by using the specific function with the luminance data as the parameter;

a divider to divide the quantized integer of the second representative value by the integer N;

a calculator to count the number of remainders given by the divider, the remainders corresponding to a video zone of a specific size; and a tamper detector to determine that the video data has been tampered with in the video zone of the specific size when tamper criteria $A/(A+C) \leq Z2$ is met, where A is the number of remainders zeros among the remainders given by the divider and C is the number of remainders among the remainders given by the divider but each being a median from among zero to the integer N, and Z2 is a preset value equal to or larger than 1/N, the remainders to be counted as the number C being two integers most close to the integer N when the integer N is an odd number.

9. A method of encryptically processing digital video data, followed by an encoding procedure to the processed digital video data with orthogonal transform to produce a coded video signal, the method comprising the steps of:

obtaining a representative value of luminance of a plurality of pixels of the digital video data for each of pixel blocks having a predetermined number of pixels, each pixel block corresponding to a unit of data subjected to the encoding procedure, as a quantized integer for each pixel block by using a specific function with the stored luminance data as a parameter;

determining whether the quantized integer of the representative value for each pixel block is a multiple of a preset integer N of two or larger, and, if not, rewriting the stored luminance data with a specific requirement giving the least range of change in gradation so that the quantized integer becomes a multiple of the integer N, whereas the stored luminance data remain unchanged if the quantized integer is a multiple of the integer N, thus encryptically processing the digital video data; and encoding the encryptically processed digital video data with orthogonal transform to produce a coded video signal.

10. A method of determining whether digital video data has been tampered with, the method comprising the steps of:

decoding a coded video signal produced by obtaining a first representative value of luminance data of a plurality of pixels of digital video data for each of pixel blocks, as a quantized integer for each pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal;

obtaining a second representative value of the luminance data of the decoded video signal as a quantized integer for each pixel block by using the specific function with the luminance data as the parameter;

dividing the quantized integer of the second representative value by the integer N; and determining that the video data has been tampered with when remainders of division meet predetermined tamer criteria.

11. The method of determining whether digital video data has been tampered with according to claim 10, wherein the dividing step is performed for all the pixel blocks to obtain remainders, the determination step including the step of determining that the video data has been tampered with when at least one remainder other than zero is found among the remainders for one pixel block of the video data.

12. The method of determining whether digital video data has been tampered with according to claim 10 further comprising the step of counting the number of remainders given in the dividing step, the remainders corresponding to a video zone of a specific size, the determining step including the step of determining that the video data has been tampered with in the video zone of the specific size when tamper criteria $A/(A+B) \leq Z1$ is met, where A and B are the number of remainders zeros and other remainders, respectively, among the remainders given in the dividing step, and Z1 is a preset value larger than 1/N.

13. The method of determining whether digital video data has been tampered with according to claim 10, wherein the integer N is four or larger, the method further comprising the step of counting the number of remainders given in the dividing step, the remainders corresponding to a video zone of a specific size, the determining step including the step of determining that the video data has been tampered with in the video zone of the specific size when tamper criteria A/(A+C)≦Z2 is met, where A is the number of remainders zeros among the remainders given in the dividing step and C is the number of remainders among the remainders given in the dividing step but each being a median from among zero to the integer N, and Z2 is a preset value larger than 1/N, the remainders to be counted as the number C being two integers most close to the integer N when the integer N is an odd number.

14. A method of determining whether digital video data has been tampered with, the method comprising the steps of:

decoding a coded video signal produced by obtaining a first representative value of luminance data of a plurality of pixels of digital video data for each of pixel blocks, as a quantized integer for each pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal;

obtaining a second representative value of the luminance data of the decoded video signal as a quantized integer for each pixel block by using the specific function with the luminance data as the parameter;

dividing the quantized integer of the second representative value by the integer N, the division being performed for all the pixel blocks to obtain remainders; and determining that the video data has been tampered with when at least one remainder other than zero is found among the remainders for one pixel block of the video data.

15. A method of determining whether digital video data has been tampered with, the method comprising the steps of:

decoding a coded video signal produced by obtaining a first representative value of luminance data of a plurality of pixels of digital video data for each of pixel blocks, as a quantized integer per pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform to produce the coded signal;

obtaining a second representative value of the luminance data of the decoded video signal as a quantized integer for each pixel block by using the specific function with the luminance data as the parameter;

dividing the quantized integer of the second representative value by the integer N;

counting the number of remainders given in the dividing step, the remainders corresponding to a video zone of a specific size; and determining that the video data has been tampered with in the video zone of the specific size when tamper criteria A/(A+B)≦Z1 is met, where A and B are the number of remainders zeros and other remainders, respectively, among the remainders given in the dividing step, and Z1 is a preset value larger than 1/N.

16. A method of determining whether digital video data has been tampered with, the method comprising the steps of:

decoding a coded video signal produced by obtaining a first representative value of luminance data of a plurality of pixels of digital video data for each of pixel blocks, as a quantized integer per pixel block by using a specific function with the luminance data as a parameter, rewriting the luminance data with a specific requirement giving the least range of change in gradation so that the quantized integer of the first representative value becomes a multiple of an integer N of four or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal;

obtaining a second representative value of the luminance data of the decoded video signal as a quantized integer for each pixel block by using the specific function with the luminance data as the parameter;

dividing the quantized integer of the second representative value by the integer N;

counting the number of remainders given in the dividing step, the remainders corresponding to a video zone of a specific size; and determining that the video data has been tampered with in the video zone of the specific size when tamper criteria A/(A+C)≦Z2 is met, where A is the number of remainders zeros among the remainders given in the dividing step and C is the number of remainders among the remainders given in the dividing step but each being a median from among zero to the integer N, and Z2 is a preset value larger than 1/N, the remainders to be counted as the number C being two integers most close to the integer N when the integer N is an odd number.

17. A computer-implemented method of for encryptically processing digital video data, followed by an encoding procedure to the processed digital video data with orthogonal transform to produce a coded video signal, the method comprising the steps of:

obtaining a representative value of luminance of a plurality of pixels of the digital video data for each of pixel blocks having a predetermined number of pixels, each pixel block corresponding to a unit of data subjected to the encoding procedure, as a quantized integer for each pixel block by using a specific function with the stored luminance data as a parameter;

determining whether the quantized integer of the representative value for each pixel block is a multiple of a preset integer N of two or larger, and, if not, rewriting the stored luminance data with a specific requirement giving the least range of change in gradation so that the quantized integer becomes a multiple of the integer N, whereas the stored luminance data remain unchanged if the quantized integer is a multiple of the integer N, thus encryptically processing the digital video data; and encoding the encryptically processed digital video data with orthogonal transform to produce a coded video signal.

18. A computer-implemented method of determining whether digital video data has been tampered with, the method comprising the steps of:

decoding a coded video signal produced by obtaining a first representative value of luminance data of a plurality of pixels of digital video data for each of pixel blocks, as a quantized integer for each pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal;

obtaining a second representative value of the luminance data of the decoded video signal as a quantized integer for each pixel block by using the specific function with the luminance data as the parameter;

dividing the quantized integer of the second representative value by the integer N; and determining that the video data has been tampered with when remainders of division meet predetermined tamer criteria.

19. The computer-implemented method of determining whether digital video data has been tampered with according to claim 18, wherein the dividing step is performed for all the pixel blocks to obtain remainders, the determination step including the step of determining that the video data has been tampered with when at least one remainder other than zero is found among the remainders for one pixel block of the video data.

20. The computer-implemented method of determining whether digital video data has been tampered with according to claim 18 further comprising the step of counting the number of remainders given in the dividing step, the remainders corresponding to a video zone of a specific size, the determining step including the step of determining that the video data has been tampered with in the video zone of the specific size when tamper criteria A/(A+B)≦Z1 is met, where A and B are the number of remainders zeros and other remainders, respectively, among the remainders given in the dividing step, and Z1 is a preset value larger than 1/N.

21. The computer-implemented method of determining whether digital video data has been tampered with according to claim 18, wherein the integer N is four or larger, the method further comprising the step of counting the number of remainders given in the dividing step, the remainders corresponding to a video zone of a specific size, the determining step including the step of determining that the video data has been tampered with in the video zone of the specific size when tamper criteria A/(A+C)≦Z2 is met, where A is the number of remainders zeros among the remainders given in the dividing step and C is the number of remainders among the remainders given in the dividing step but each being a median from among zero to the integer N, and Z2 is a preset value larger than 1/N, the remainders to be counted as the number C being two integers most close to the integer N when the integer N is an odd number.

22. A computer-implemented method of determining whether digital video data has been tampered with, the method comprising the steps of:

decoding a coded video signal produced by obtaining a first representative value of luminance data of a plurality of pixels of digital video data for each of pixel blocks, as a quantized integer for each pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal;

obtaining a second representative value of the luminance data of the decoded video signal as a quantized integer for each pixel block by using the specific function with the luminance data as the parameter;

dividing the quantized integer of the second representative value by the integer N, the division being performed for all the pixel blocks to obtain remainders; and determining that the video data has been tampered with when at least one remainder other than zero is found among the remainders for one pixel block of the video data.

23. A computer-implemented method of determining whether digital video data has been tampered with, the method comprising the steps of:

decoding a coded video signal produced by obtaining a first representative value of luminance data of a plurality of pixels of digital video data for each of pixel blocks, as a quantized integer per pixel block by using a specific function with the luminance data as a parameter, rewriting the luminance data with a specific requirement giving the least range of change in gradation so that the quantized integer of the first representative value becomes a multiple of an integer N of two or larger, whereas the luminance data remain unchanged if the quantized integer of the first representative value is a multiple of the integer N, thus encryptically processing the digital video data, and encoding the encryptically processed digital video data with orthogonal transform to produce the coded signal;

obtaining a second representative value of the luminance data of the decoded video signal as a quantized integer for each pixel block by using the specific function with the luminance data as the parameter;

dividing the quantized integer of the second representative value by the integer N;

counting the number of remainders given in the dividing step, the remainders corresponding to a video zone of a specific size; and determining that the video data has been tampered with in the video zone of the specific size when tamper criteria A/(A+B)≦Z1 is met, where A and B are the number of remainders zeros and other remainders, respectively, among the remainders given in the dividing step, and Z1 is a preset value larger than 1/N.

24. A computer-implemented method of determining whether digital video data has been tampered with, the method comprising the steps of:

decoding a coded video signal produced by obtaining a first representative value of luminance data of a plurality of pixels of digital video data for each of pixel blocks, as a quantized integer per pixel block by using a specific function with the luminance data as a parameter, rewriting the luminance data with a specific requirement giving the least range of change in gradation so that the quantized integer of the first representative value becomes a multiple of an integer N of four or larger, whereas the luminance data remain unchanged if the quantized integer of the first representative value is a multiple of the integer N, thus encryptically processing the digital video data, and encoding the encryptically processed digital video data with orthogonal transform for each pixel block to produce the coded signal;

obtaining a second representative value of the luminance data of the decoded video signal as a quantized integer for each pixel block by using the specific function with the luminance data as the parameter;

dividing the quantized integer of the second representative value by the integer N;

counting the number of remainders given in the dividing step, the remainders corresponding to a video zone of a specific size; and determining that the video data has been tampered with in the video zone of the specific size when tamper criteria $A/(A+C) \leq Z2$ is met, where A is the number of remainders zeros among the remainders given in the dividing step and C is the number of remainders among the remainders given in the dividing step but each being a median from among zero to the integer N, and Z2 is a preset value larger than 1/N, the remainders to be counted as the number C being two integers most close to the integer N when the integer N is an odd number.

* * * * *